(12) United States Patent
Moir et al.

(10) Patent No.: US 8,909,601 B2
(45) Date of Patent: Dec. 9, 2014

(54) SYSTEM AND METHOD FOR IMPLEMENTING SHARED SCALABLE NONZERO INDICATORS

(75) Inventors: Mark S. Moir, Windham, NH (US); Yosef Lev, Cambridge, MA (US); Victor M. Luchangco, Cambridge, MA (US); David Dice, Foxboro, MA (US)

(73) Assignee: Oracle America, Inc., Redwood City, CA (US)

( * ) Notice: Subject to any disclaimer, the term of this patent is extended or adjusted under 35 U.S.C. 154(b) by 1931 days.

(21) Appl. No.: 11/939,372

(22) Filed: Nov. 13, 2007

(65) Prior Publication Data

US 2009/0125548 A1    May 14, 2009

(51) Int. Cl.
*G06F 9/52*    (2006.01)
*G06F 13/14*   (2006.01)

(52) U.S. Cl.
CPC ........................ *G06F 9/52* (2013.01)
USPC ......................................... 707/624

(58) Field of Classification Search
CPC ........................................ G06F 9/52
USPC ............ 707/999.955, 999.103, 999.106, 695; 707/704, 999.203; 719/310, 312–315; 709/220, 215
See application file for complete search history.

(56) References Cited

U.S. PATENT DOCUMENTS

| | | | |
|---|---|---|---|
| 6,067,608 A | 5/2000 | Perry | |
| 6,247,025 B1 * | 6/2001 | Bacon | 1/1 |
| 7,035,870 B2 * | 4/2006 | McGuire et al. | 707/704 |
| 7,133,977 B2 | 11/2006 | Pudipeddi et al. | |
| 7,716,192 B2 * | 5/2010 | Petrank et al. | 707/695 |
| 2006/0200635 A1 | 9/2006 | Pudipeddi et al. | |
| 2006/0224949 A1 | 10/2006 | Oyama | |
| 2006/0253655 A1 | 11/2006 | Pudipeddi et al. | |
| 2007/0050381 A1 * | 3/2007 | Hu et al. | 707/100 |

OTHER PUBLICATIONS

Baker, Henry G., "Minimizing Reference Count Updating with Deferred and Anchored Pointers for Functional Data Structures," 1994.

* cited by examiner

*Primary Examiner* — Usmaan Saeed
*Assistant Examiner* — Cecile Vo
(74) *Attorney, Agent, or Firm* — Robert C. Kowert; Meyertons, Hood, Kivlin, Kowert & Goetzel, P.C.

(57) ABSTRACT

A Scalable NonZero Indicator (SNZI) object in a concurrent computing application may include a shared data portion (e.g., a counter portion) and a shared nonzero indicator portion, and/or may be an element in a hierarchy of SNZI objects that filters changes in non-root nodes to a root node. SNZI objects may be accessed by software applications through an API that includes a query operation to return the value of the nonzero indicator, and arrive (increment) and depart (decrement) operations. Modifications of the data portion and/or the indicator portion may be performed using atomic read-modify-write type operations. Some SNZI objects may support a reset operation. A shared data object may be set to an intermediate value, or an announce bit may be set, to indicate that a modification is in progress that affects its corresponding indicator value. Another process or thread seeing this indication may "help" complete the modification before proceeding.

20 Claims, 12 Drawing Sheets

SYSTEM AND METHOD FOR IMPLEMENTING SHARED SCALABLE NONZERO INDICATORS

BACKGROUND OF THE INVENTION

1. Field of the Invention

This invention relates generally to concurrent access to shared objects, and more particularly to a system and method for implementing shared scalable nonzero indicators.

2. Description of the Related Art

Shared counters are useful for a variety of purposes and been heavily studied as an important basic building block in many concurrent algorithms. This research has shown that it is very challenging to achieve a non-blocking solution that combines the desirable properties of linearizability, scalability (i.e., being independent of the number of threads/processes), and low latency.

Reference counters are used in a variety of contexts for determining when a resource is no longer in use and can thus be reclaimed. For example, some garbage collectors use reference counting to determine when an object is no longer reachable. Unfortunately, however, occasionally an object is heavily shared, meaning that many processes or threads access the reference count at once, resulting in poor scalability. While reference counting is a simple and attractive technique, it has the disadvantage that the use of simple counters to track references inhibits scalability; this factor alone can make reference counting unacceptable in some contexts.

Traditional counters provide increment and decrement operations that return the value of the counter immediately before the modification, and sometimes a read operation that returns the counter's value without modifying it. It is straightforward to implement a non-blocking shared counter in modem shared memory multi-processors, for example by repeatedly using the compare-and-swap (CAS) instruction to attempt to update the counter. While this approach is simple, non-blocking, linearizable, and reasonably fast in the absence of contention, it is not scalable. Severe performance degradation occurs under heavy use, as contention for the counter arises, as well as excessive memory interconnect traffic produced by successful and failed attempts. For example, if two threads increment a shared counter at approximately the same time, they must receive different and consecutive return values, and thus they must synchronize. An implementation that must be fast in the absence of contention must detect such contention quickly when it occurs. This is difficult, if not impossible, using traditional counter semantics.

SUMMARY

Systems and methods for implementing and using a Scalable NonZero Indicator (SNZI) object as a shared object in concurrent computing applications are disclosed. In various embodiments, a SNZI object may be used as a reference counter or to implement ownership records for a shared resource in a computing system configured for concurrent computing, such as one that includes a multi-threaded processor, a multi-core processor, and/or a system architecture suitable for implementing concurrent computing.

A SNZI object may in some embodiments be used in conjunction with applications that do not need to know the actual value of a shared data object, but only whether its value is zero or nonzero. In some embodiments, a SNZI object may include a counter portion and a nonzero indicator portion, and/or may be an element in a hierarchy of SNZI objects configured to filter changes in non-root nodes of the hierarchy to a root node of the hierarchy.

In some embodiments, when a value is written to a shared data object, such as a reference counter or ownership record, by one thread or process, the system may be configured to determine whether the value of the shared data object changed from zero to a nonzero value or from a nonzero value to zero. If the value changed from zero to a nonzero value, a nonzero indicator object may be set, indicating that the new value of the shared data object is nonzero. If the value changed from a nonzero value to zero, a nonzero indicator object may be cleared, indicating that the new value of the shared data object is zero. If the value did not change from zero to a nonzero value or from a nonzero value to zero, the current value of a nonzero indicator object may be preserved. Modifications of the data object and/or the indicator object may be performed using atomic read-modify-write type operations, in some embodiments and under some circumstances.

A different thread or process may read the value of the shared indicator object to determine if the value of the shared data object is zero or nonzero, rather than reading the value of the shared object itself. In some embodiments, this thread or process may release or reclaim a shared resource in response to the value of the nonzero indicator being zero. For example, if the value of the nonzero indicator object indicates that the value of a reference counter for a shared resource is zero, a garbage collector may release or reclaim the shared resource.

In some embodiments, when a process or thread initiates incrementing or decrementing a shared data object (e.g., to change the shared data object value from zero to nonzero or vice versa) the shared data object may be set to an intermediate value or an announce bit may be set, either of which may indicate to another process or thread that a modification that will affect the nonzero indicator is in progress. If the modification has not been completed when another process or thread attempts to modify the shared data object (e.g., if the shared data object contains the intermediate value or the announce bit is still set) the other process or thread may "help" the first process or thread to complete the modification before doing its own work.

In embodiments that include a hierarchy of SNZI objects, when the value of a non-root SNZI object changes from zero to a nonzero value, its parent SNZI object may be incremented, and when the value of the non-root SNZI object changes from a nonzero value to zero, its parent SNZI object may be decremented. In some embodiments, a SNZI root node object may include different features than non-root node SNZI objects, while in other embodiments any two of the SNZI objects in a tree may include the same or different features.

A SNZI object may be accessed by software applications through a defined application programming interface (API), which may include arrive (increment) and depart (decrement) operations, as well as a query operation that returns the value of the nonzero indicator (e.g., "true" or "1" if the number of arrive operations exceeds the number of depart operations, otherwise "false" or "0"). Note that, as used herein, "incrementing" a Boolean shared indicator may refer to changing its value from 0 to 1 (i.e., "setting" it), and "decrementing" a Boolean shared indicator may refer to changing its value from 1 to 0 (i.e., "clearing" it), in various embodiments. Some SNZI objects may also support a reset operation. In such embodiments, arrive and depart operations may pertain to a particular "epoch", the query operation may determine whether the number of arrive operations exceeds the number of depart operations for the current epoch, and the reset operation may cause a transition to a new epoch.

The methods described herein may be implemented by program instructions included in a memory coupled to one or more processors in a computing system, (e.g., by program instructions included in a computer-readable storage medium and executable by the one or more processors in the computing system), in some embodiments. The program instructions may be included in the same memory as one in which the shared data object(s) and/or shared nonzero indicator(s) are instantiated, or in a different memory, in different embodiments.

Figure 1:
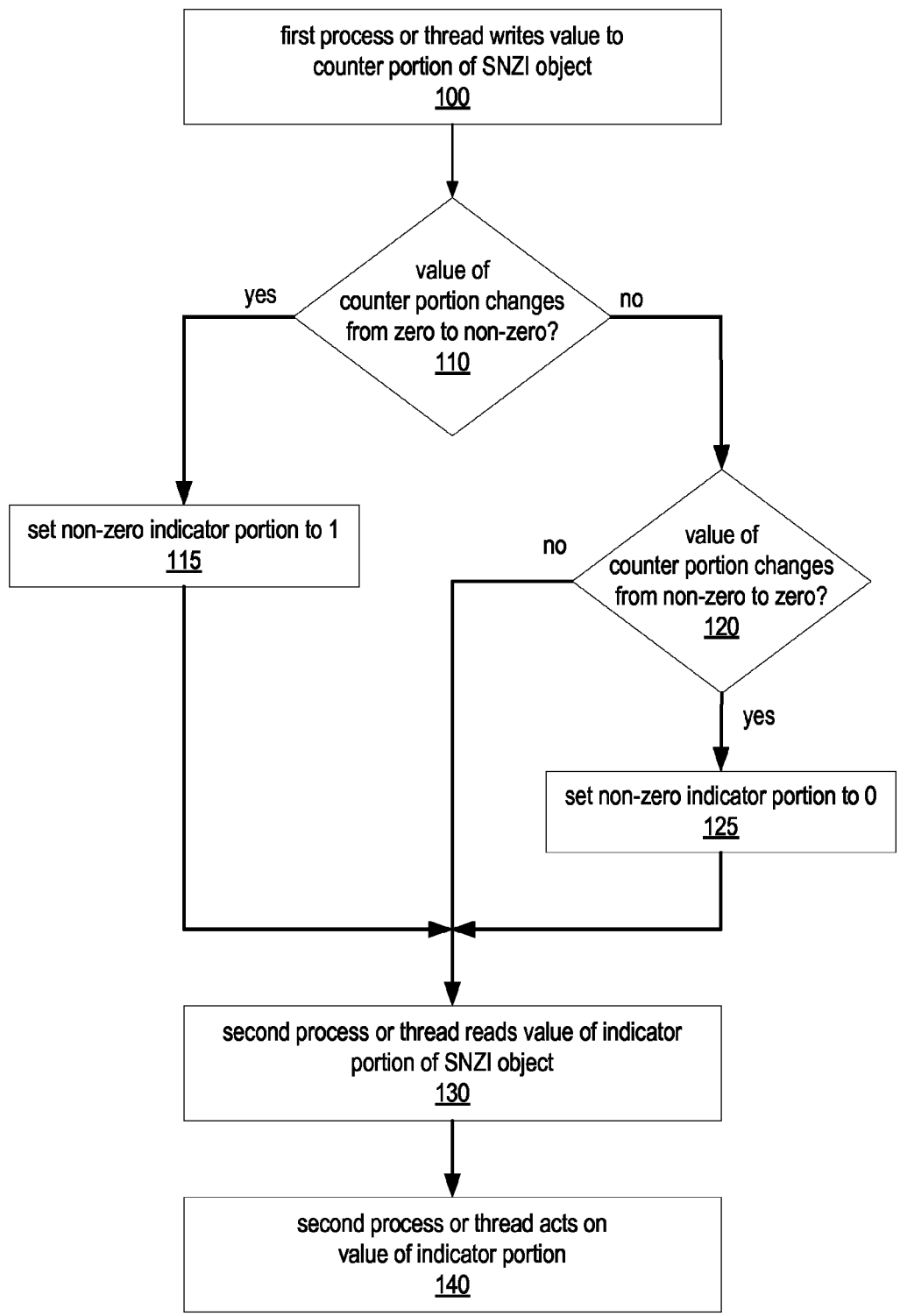
FIG. 1 is a flowchart illustrating one embodiment of a method for using a scalable nonzero indicator object, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for implementing and using a Scalable NonZero Indicator (SNZI) object as a shared object in concurrent computing applications are disclosed. Such an object may implement weaker semantics than a traditional counter, and may be used in conjunction with, or in place of, a shared counter, in some embodiments. In many applications, the full semantics of traditional shared counters may not be needed. Instead, it may be sufficient to be able to determine whether the value of a counter is zero or nonzero, rather than determining its exact value. Specifically, it may not be necessary for each operation on a SNZI object to return the exact value of the counter; instead, it may only be necessary to determine a "summary value," such as whether the counter value is zero or nonzero.

A SNZI object may in some embodiments be implemented as a shared object that supports "arrive" and "depart" operations, as well as a query operation. The arrive operation may increment a counter, while the depart operation may decrement it. The query operation may return a Boolean value indicating whether or not there have been a surplus of arrive operations (i.e., whether the number of arrive operations exceeds the number of depart operations). In other words, a query operation may return the value of a summary indicator that represents a summary value for a shared data object, rather than the value of the shared data object itself.

In some embodiments, the weaker semantics of SNZI objects may be exploited to achieve implementations with better performance characteristics than a traditional counter-based implementation. For example, when contention on a shared resource is high, the surplus may change much more frequently than the query result, which changes only when the surplus changes from 0 to 1 and vice versa. A SNZI object may in some embodiments be easy to implement with a simple shared counter, which provides increment and decrement operations that return the value of the counter immediately before modifying it, and a read operation that returns the value of the counter without modifying it. In some embodiments, the read operation may access an indicator portion of the SNZI object that may be stored and/or accessed separately from a counter portion of the object. In some such embodiments, a memory location (corresponding to an indicator portion of a SNZI object) that is read by a query may remain in a processor cache even while many arrive and depart operations on the shared object (e.g., on the counter portion of the SNZI object) are performed. This may make subsequent query operations faster, and may have other benefits, as described below.

In some embodiments, a hierarchical tree of SNZI objects may be used to "filter" contention on the objects above. Therefore, if contention is high, the operations may reap the benefit of more levels of filtering. In another embodiment, a SNZI tree that scales well may be combined with a simple counter that works well at low contention. Such an embodiment may avoid the space overhead needed for a tree until (or unless) it is used, and may only require this space for heavily shared objects, rather than for all objects. In some embodiments, a SNZI object may also support a reset operation. Such an implementation may be referred to as a SNZI-R object. In some embodiments, SNZI and SNZI-R objects may be used to improve the performance and scalability of software and hybrid transactional memory systems. Various embodiments employing hierarchical trees of SNZI nodes, combinations of a simple counter and a SNZI or SNZI-R tree, and the use of SNZI and/or SNZI-R objects in transactional memories are described in more detail below.

One method for implementing and using a SNZI object comprising a counter portion and an indicator portion is illustrated by way of example in FIG. 1, according to one embodiment. In this example, a first process or thread may atomically change the value of the counter portion of a SNZI object, as in 100. As noted above, writing a value to a SNZI object may in some embodiments involve incrementing or decrementing a counter using an operation that returns the value of the counter immediately before modifying it.

The method may include determining if, as a result of the first process or thread writing a value to the counter portion, the value of the counter portion changes from zero to a nonzero value, as in 110. If the value of the counter portion changed from zero to a nonzero value, shown as the positive exit from 110, the method may include setting a nonzero indicator portion of the SNZI object to a value of 1 (indicating that the value of the counter portion is nonzero). As illustrated in FIG. 1, the method may then continue at block 130.

If the value of the counter portion did not change from zero to a nonzero value, shown as the negative exit from 110, the method may include determining if, as a result of the first process or thread writing a value to the counter portion, the value of the counter portion changed from a nonzero value to zero, as in 120. If the value of the counter portion changed from a nonzero value to zero, shown as the positive exit from 120, the method may include setting a nonzero indicator portion of the SNZI object to a value of 0 (indicating that the value of the counter portion is zero). As illustrated in FIG. 1, the method may then continue at block 130. If the value of the counter portion did not change from a nonzero value to a value of zero, shown as the negative exit from 120, the method may continue at block 130 without a change to the nonzero indicator portion of the SNZI object (i.e., preserving the current value of the nonzero indicator portion of the SNZI object).

As illustrated in FIG. 1, a second process or thread may read the value of the indicator portion of the SNZI object, as in 130. As noted above, the SNZI object may support a read operation that returns this value, rather than the value of the counter portion of the SNZI object. For example, in some embodiments, a query operation performed on a SNZI object may return the value of its nonzero indicator portion, while increment and decrement operations may return the value of the counter portion immediately before modification. The second process or thread may then act based on the value of the indicator portion returned, as in 140.

The weaker semantics of SNZI objects may allow for concurrent computing solutions that are practical, non-blocking, linearizable, scalable, and efficient in the absence of contention. For example, as noted above, reference counting is a common technique for determining when a resource can be reclaimed (e.g., by a garbage collector) because it is no longer reachable. However, the garbage collector may need not to determine the exact number of active references to a resource, but may only need to know whether there are any active references. Therefore, in some embodiments, a SNZI object may replace a reference counter in such applications, and may improve the scalability of reference-counting garbage collectors. In the example illustrated in FIG. 1, if the second process or thread is a garbage collector and the SNZI object is used as a reference counter for a shared resource, the garbage collector may reclaim the shared resource if the value of the nonzero indicator portion is zero (indicating that no processes or threads are currently referencing the shared resource). If the value of the nonzero indicator portion is one (indicating that at least one other process or thread is currently referencing the shared resource), the garbage collector may not reclaim the shared resource at that time.

As discussed above, the use of a separate nonzero indicator portion within a shared object containing a counter may be useful in applications in which the value of a counter may change often, but in which the actual value is less important than the fact that the value is zero or nonzero. In some embodiments, because the value of this separate nonzero indicator portion may not change very often, it may remain in a cache memory more often than the value of the counter portion, and may increase a cache hit rate (and thus, overall query performance) for those applications over the use of a traditional reference counter.

Figure 2:
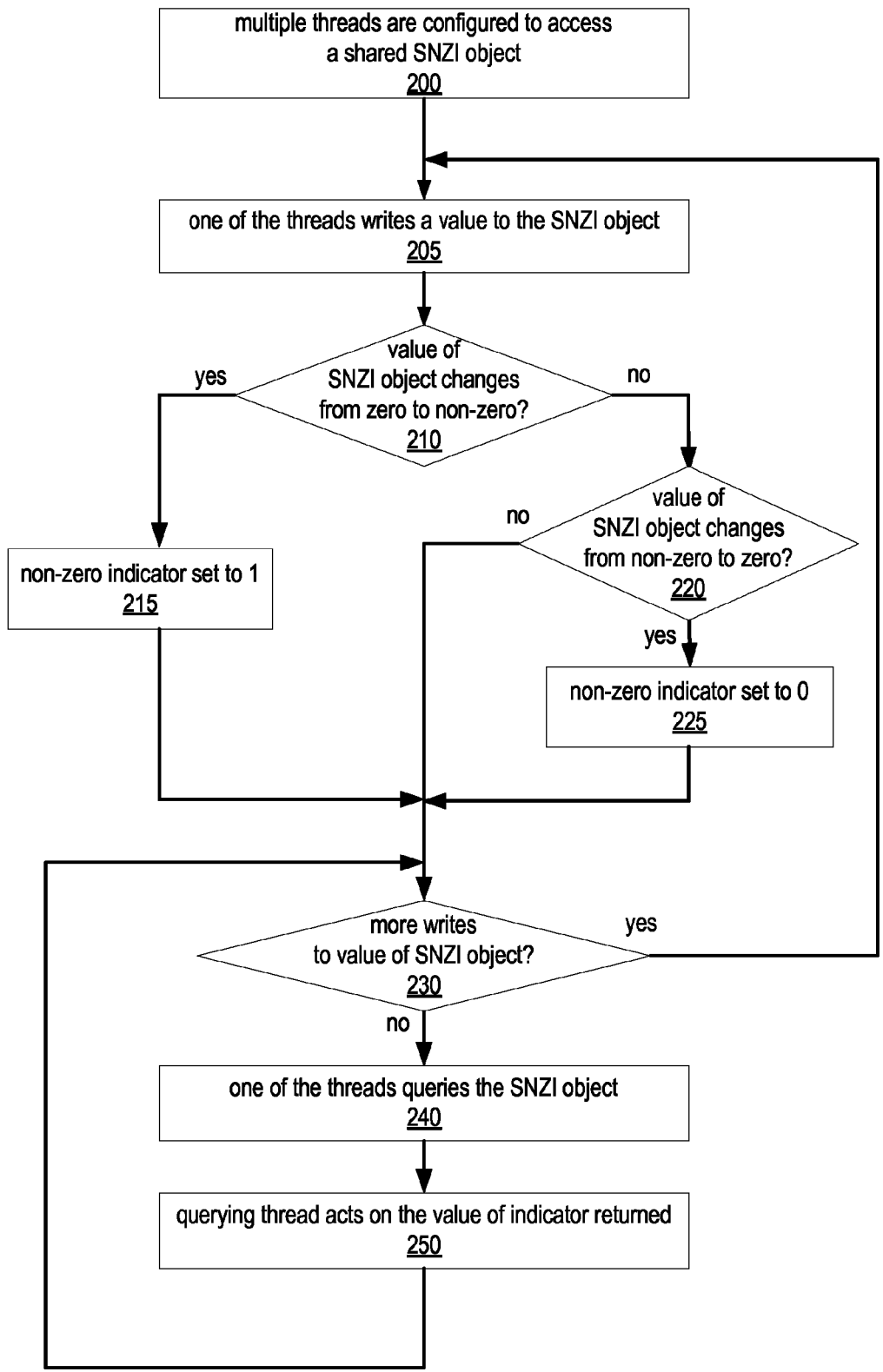
FIG. 2 is a flowchart illustrating a method for using a scalable nonzero indicator object, according to another embodiment.

Another example of the use of a SNZI object is illustrated in FIG. 2, according to one embodiment. This example illustrates multiple accesses to a SNZI object by one or more threads for modifying and/or querying the object. In this example, multiple threads are configured to access a shared SNZI object, as in 200. As in the previous example, one of the threads writes a value to the shared SNZI object, as in 205. While the previous example assumed that a write to a SNZI object corresponds to an increment or decrement operation, in other embodiments, other operations may result in a write operation to the SNZI object, or an explicit write operation may be supported in some embodiments, allowing a specified value to be written to the SNZI object. As described above, a write operation may return the value of the SNZI object immediately before modification, in some embodiments, which may allow a change from zero to a nonzero value (or vice versa) to be detected.

In this example, the method may include determining if, as a result of the write operation of the first thread, the value of the SNZI object changes from zero to a nonzero value, as in 210. If the value of the SNZI object changed from zero to a nonzero value, shown as the positive exit from 210, a nonzero indicator of the SNZI object may be set to 1. If the value of the SNZI object did not change from zero to a nonzero value, shown as the negative exit from 210, the method may include determining if the value of the SNZI object changed from a nonzero value to zero, as in 220. If the value of the SNZI object changed from a nonzero value to zero, shown as the positive exit from 220, a nonzero indicator of the SNZI object may be set to 0. If the value of the SNZI object did not change from a nonzero value to zero, shown as the negative exit from 220, the method may continue at 230, preserving the current value of the nonzero indicator of the SNZI object. Similarly, after the nonzero indicator value is changed (in 215 or 225), the method may continue at 230.

In the example illustrated in FIG. 2, if there are more writes to the value of the SNZI object by one or more of the threads configured to access it, the operations illustrated in 205, 210, 215, 220, and/or 225 may be repeated for each write to the SNZI object. This is illustrated by the loop from the positive exit of 230 to block 205.

At any point during execution, one of the threads configured to access the SNZI object may query the SNZI object, as in 240. As described above, the semantics of the SNZI object may define a query operation that returns the value of its nonzero indicator, rather than the value of the SNZI object itself (i.e., the value most recently written to the SNZI object). After querying the SNZI object and receiving the value of its nonzero indicator, the querying thread may act based on the value received, as in 250. As illustrated in FIG. 2., other query operations by any of the threads configured to access the SNZI object may be performed. This is indicated by the feedback loop from block 250 to block 230, which may result in a repeat of the operations illustrated in 240 and 250, rather than a repeat of the operations illustrated in 205, 210, 215, 220, and/or 225.

As discussed above, because the value of the SNZI object may change more often than the value of its nonzero indicator, a query of the SNZI object may result in a cache hit for the indicator value, and may be a faster operation than a read of a traditional counter or other shared memory location that changes often (and thus, does not remain in a cache very long). This may allow applications that merely query the SNZI object for an indication that the value is zero or nonzero to execute faster than those that read an exact value of a shared object when querying it.

Because the SNZI object may be accessible by concurrently executing threads, one thread may attempt to query the SNZI object at approximately the same time another thread may be writing a value to the SNZI object. Maintaining a correct query result in light of such contentions is discussed in more detail below, according to various embodiments.

Figure 3:
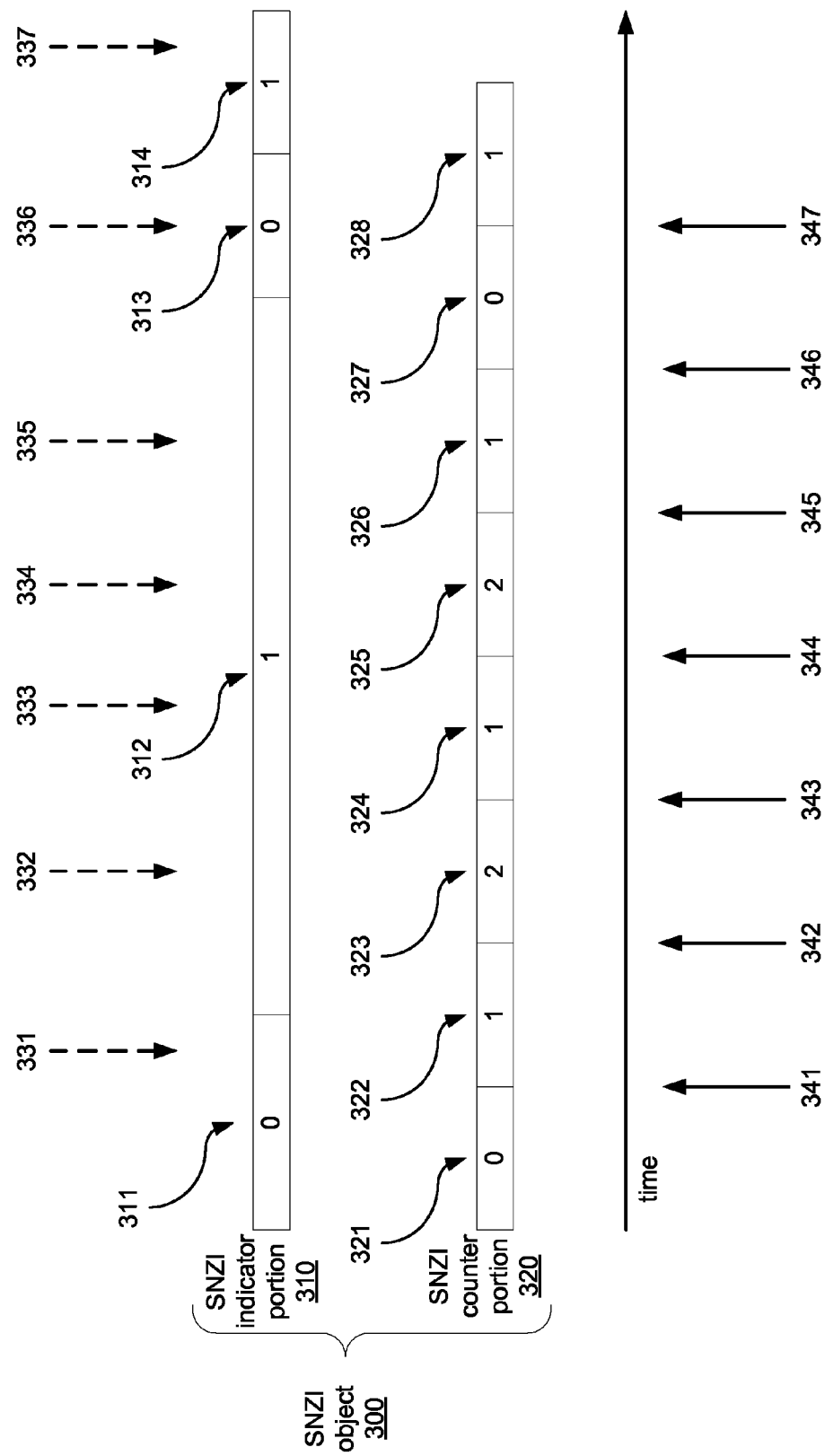
FIG. 3 is a diagram illustrating accesses of a SNZI object by one or more processes over time, according to one embodiment.

Another example of the use of a SNZI object that includes a counter portion and a separate nonzero indicator portion is illustrated in FIG. 3, according to one embodiment. In this example, a SNZI object 300 includes a counter portion 320 and an indicator portion 310. In the example illustrated in FIG. 3, the values of the counter portion 320 and indicator portion 310 are depicted over time, which advances from left to right. Solid vertical arrows indicate write accesses to the SNZI object (e.g., increment, decrement, or other write operations), and dashed vertical arrows indicate read access to the SNZI object (e.g., query operations).

In the example illustrated in FIG. 3, the value of the counter portion 320 changes frequently, having values of 0, 1, 2, 1, 2, 1, 0, and 1 during the time illustrated (shown as values 321-328). However, the value of the indicator portion 310 changes only three times in the same time period, having values of 0, 1, 0, and 1 (shown as values 311-314). For example, when the counter portion 320 changes from value 321 (0) to 322 (1) based on write operation 341, this causes a corresponding change in the indictor portion 310 from value 311 (0) to 312 (1). This is because the value of the counter portion 320 changed from zero to a nonzero value.

The next four changes to the counter portion 320, from 322 (1) to 323 (2) based on write operation 342, from 323 (2) to 324 (1) based on write operation 343, from 324 (1) to 325 (2) based on write operation 344, and from 325 (2) to 326 (1) based on write operation 345, have no effect on the value of indicator portion 310. This is because none of these changes in counter portion 320 result in a change from a nonzero value to a value of zero or vice versa.

A change to the counter portion 320 based on write operation 346, on the other hand, results in a change to indicator portion 310. This is because operation 346 results in the value of counter portion 320 changing from a nonzero value (1, shown as value 326) to a value of zero (shown as value 327). As a result of this change in counter portion 320, the value of indicator portion 310 changes from 1 (shown as value 312) to 0 (shown as value 313). Similarly, write operation 347 results in a change in both counter portion 320 and indicator portion 310, since it causes a change in the value of counter portion 320 from a value of zero (shown as 327) to a nonzero value (shown as value 328).

In the example illustrated in FIG. 3, query operation 331 may return the current value of the indicator portion 310, in this case 0 (shown as value 311), while query operation 332 may return a value of 1 (shown as value 312). As described above, value 312 is set to 1 in response to the change in the value of the counter portion 320 based on operation 341. As illustrated in FIG. 3, a change to the indicator portion of a SNZI object may in some embodiments lag, or be otherwise asynchronous to, a change in the counter portion of the SNZI object. This is discussed in more detail below.

In the example illustrated in FIG. 3, query operations 333, 334, and 335 may all return a value of 1 (shown as value 312), since the value of indicator portion 310 does not change during this time period (despite several changes to counter portion 320). As noted above, the value of indicator portion 310 may be placed in a cache when read by query operation 332, in some embodiments. In such embodiments, query operations 333, 334, and 335 may execute faster than query operation 332, since the value of the indicator portion may remain in the cache until it changes value. Query operations 336 and 337, on the other hand, may execute slower than query operations 333-335, since each query returns a different value for the SNZI object (and, thus, may result in a cache miss).

Figure 4:
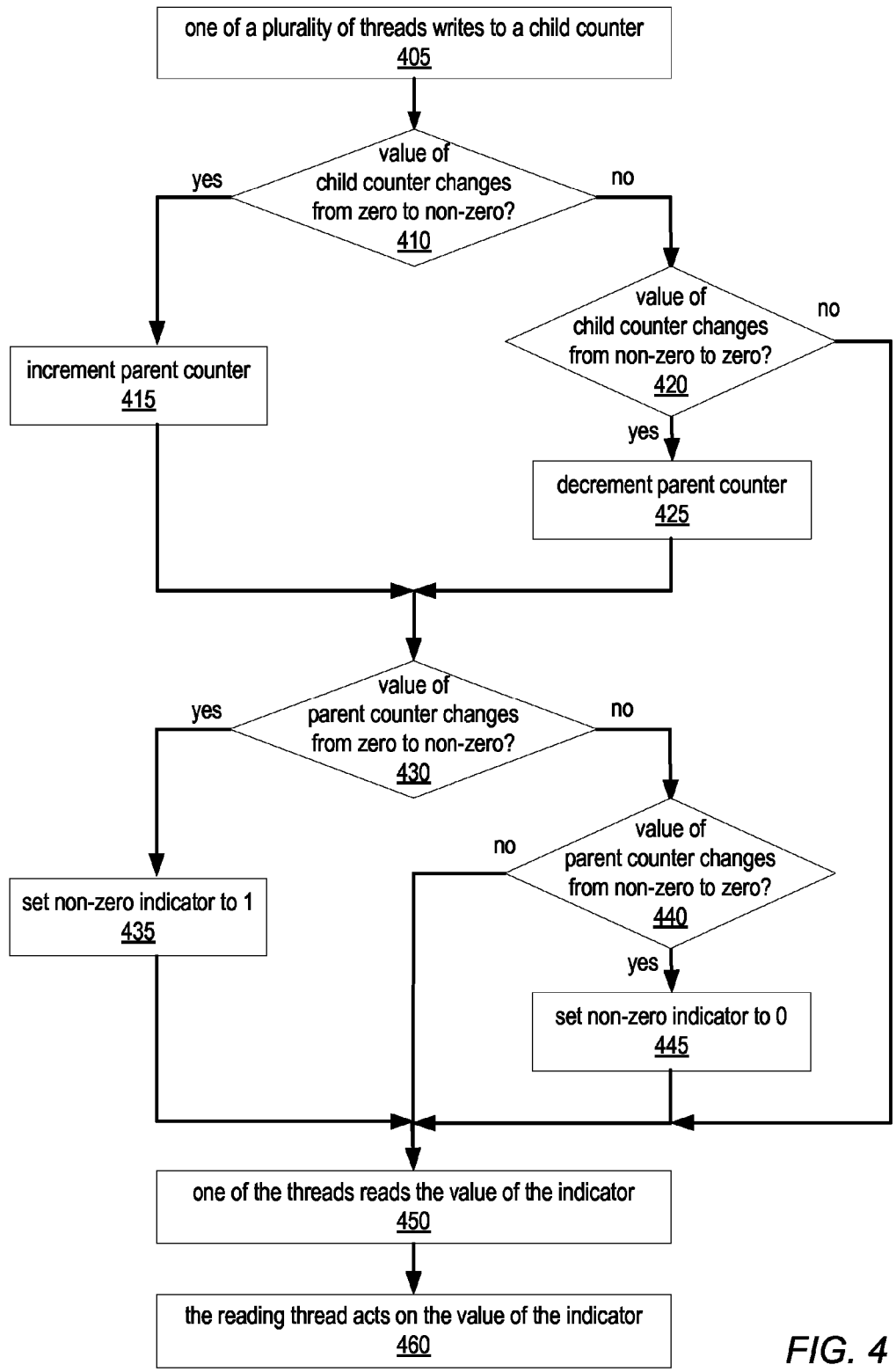
FIG. 4 is a flowchart illustrating one method for implementing a hierarchy of counters using SNZI objects, according to one embodiment.

As previously noted, in some embodiments, a hierarchical tree of nodes may be used to "filter" contention on the nodes above. In some such embodiments, if contention is high the operations may reap the benefit of more levels of filtering, but if it is low, they may finish faster. One method for implementing such a hierarchy is illustrated in FIG. 4, according to one embodiment. This example illustrates a two-level hierarchy, in which changes to a child counter may or may not affect its parent counter, according to semantics similar to those described above. In this example, the method may include one of a plurality of threads writing a value to a child counter, as in 405. As described above, writing a value to a counter may involve incrementing the counter, decrementing the counter, or explicitly writing a value to the counter, in different embodiments. The child counter may in some embodiments be implemented as a counter portion of a SNZI object.

In the example illustrated in FIG. 4, the method may include determining if, as a result of the thread writing to the child counter, the value of the child counter changes from zero to a nonzero value, as in 410. If the value of the child counter changed from zero to a nonzero value, shown as the positive exit from 410, the method may include incrementing the parent counter, as in 415. If the value of the child counter did not change from zero to a nonzero value, shown as the negative exit from 410, the method may include determining if the value of the child counter changed from a nonzero value to zero, as in 420. If the value of the child counter changed from a nonzero value to zero, shown as the positive exit from 420, the method may include decrementing the parent counter, as in 425. If the value of the child counter did not change from a nonzero value to zero, shown as the negative exit from 420, the method may include continuing at 450 without changing the value of the parent counter. In embodiments in which the child counter is implemented as a counter portion of a SNZI object, a nonzero indicator portion of the SNZI object may be configured to reflect whether the value of the counter portion is zero or nonzero, as described above. In some embodiments, determining if a child counter value changed from zero to nonzero or vice versa may involve a query of the SNZI object, as described above, before and after the child counter is written. This query operation may return the value of the nonzero indicator portion of the SNZI object. If the value of the nonzero indicator is the same before and after the child counter is written, there may be no change to the parent counter. If the value of the nonzero indicator changes from 1 to 0 or 0 to 1, the parent counter may be decremented or incremented, respectively. In other embodiments, the SNZI object implementing a child counter does not include a nonzero indicator, and determining if the child counter value changed from zero to nonzero or vice versa may be performed in other ways, such as by reading the value of the counter before and/or after incrementing or decrementing the child counter.

As illustrated in the example in FIG. 4, a hierarchy of counters may be used to filter many changes to a counter when an application merely needs to be able to determine if the value is zero or nonzero. For example, if a child counter is configured to count references to a shared resource by two different threads, and a parent counter is configured to be incremented when the total number of references by both threads changes from 0 to 1 (i.e., indicating that there is at least one active reference between the two threads), or to be decremented when there are no longer any references by either thread, the parent counter value may not need to change as often as if it were the only reference counter keeping track of references to that shared resource. This filtering may allow the parent counter value to remain in a cache longer than if it changes often, and may allow other threads to execute faster queries of the counter while its value remains in the cache.

Although the example illustrated in FIG. 4 includes one child counter and one parent counter, it will be understood by one skilled in the art that the method may be applied to a hierarchical tree of counters of any arbitrary depth and any number of counters, in different embodiments. For example, in one embodiment, each of two child counters may be configured to count references to a shared resource by two different threads, and a parent counter may be incremented or decremented only when the value of one of the child counters changes from 0 to 1 or vice versa. In some embodiments, the number of counters and/or the depth of the hierarchy may be dynamically adapted to meet current conditions in a concurrent computing application.

In the example illustrated in FIG. 4, the parent counter may be implemented as a counter portion of a SNZI object (whether or not all children include a nonzero indicator portion), and the parent SNZI object may include a nonzero indicator portion, as described above. In this example, after any change in the parent counter, the method may include determining if the value of the parent counter changed from zero to a nonzero value, as in 430. If so, the parent SNZI object's nonzero indicator may be set to 1, as in 435. If not, the method may include determining if the value of the parent counter changed from a nonzero value to zero, as in 440. If so, the parent SNZI object's nonzero indicator may be set to 0. Otherwise, the current value of the parent SNZI object's nonzero indicator may be preserved (i.e., it may not be changed).

As in the examples illustrated in FIGS. 1 and 2, the method may include one of the threads reading the value of the nonzero indicator (e.g., by querying the parent SNZI object), as in 450. As shown at 460, the thread may then act based on the value of the indicator, as described above.

Figure 5:
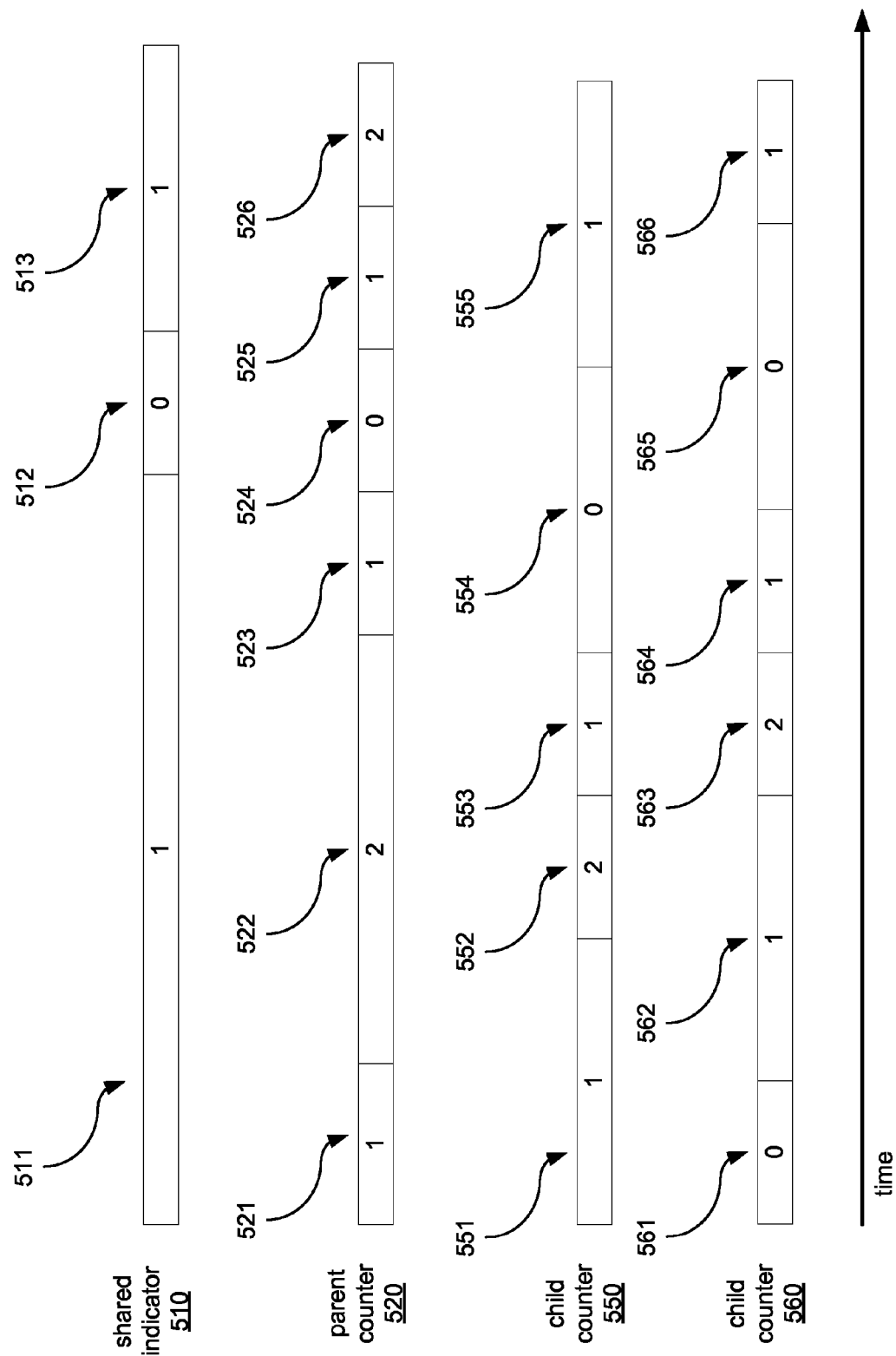
FIG. 5 is a diagram illustrating the use of SNZI objects in a hierarchy of SNZI objects over time, according to one embodiment.

One embodiment of the use of a hierarchical tree of counters employing SNZI-type semantics is illustrated in FIG. 5. In this example, the value of a parent counter 520 is affected by changes in the values of its two child counters, 550 and 560, over the time period illustrated. In this example, a change in child counter 560 from a value of 0 (shown as value 561) to a value of 1 (shown as value 562) results in parent counter 520 being incremented from a value of 1 (value 521) to 2 (value 522). The next two changes to child counter 560 (resulting in values 563 and 564) do not affect the value of parent counter 520, since they do not involve a change in the value child counter 560 from a nonzero value to zero or vice versa.

Similarly, the first two changes in the value of child counter 550 in this time period do not affect the value of parent counter 520, since they do not involve a change in the value child counter 550 from a nonzero value to zero or vice versa. However, the change from value 553 (1) to 554 (0) results in parent counter 520 being decremented, as shown in the change from value 522 (2) to value 523 (1). The change in child counter 560 from value 564 (1) to 565 (0) also results in parent counter 520 being decremented, as shown in the change from value 523 (1) to value 524 (0). If parent counter 520 is implemented as a SNZI object that includes a nonzero indicator portion 510, as described herein, its indicator portion 510 may be changed from a value of 1 (shown as value 511) to 0 (shown as value 512), in response to the parent counter value changing from 1 to 0.

In the example illustrated in FIG. 5, parent counter 520 may be incremented once (from value 524 (0) to 525 (1)) in response to a change in the value of child counter 550 from 0 (value 554) to 1 (value 555) and may be incremented again (from value 525 (1) to 526 (2)) in response to a change in the value of child counter 560 from 0 (value 565) to 1 (value 566). The change in parent counter 520 from value 524 (0) to 525 (1) may also result in the nonzero indicator portion 510 being changed from a value of 0 (value 512) to 1 (value 513), in this example.

As illustrated in FIG. 5, the use of hierarchical counters and SNZI objects may in some embodiments filter the effects of heavily shared resources. In this example, while the values of child counters 550 and 560, collectively, changed nine times, the value of parent counter 520 changed five times, and the value of nonzero indicator 510 changed only twice.

As previously noted, a SNZI object may in some embodiments be implemented as a shared object that supports "arrive" and "depart" operations, as well as a query operation, where the arrive operation increments a counter, the depart operation decrements it, and the query operation returns a Boolean value indicating whether there is a surplus of arrive operations. In some embodiments, a rooted tree of SNZI objects may be employed, in which a child is implemented using its parent. That is, an operation on a child may invoke operations on its parent. In such embodiments, a parent's surplus due to a child may be thought of as the difference between the number of arrive operations and depart operations invoked on the parent (henceforth referred to as parent.arrive and parent.depart operations) by operations of that child. In some such embodiments, the following properties may be guaranteed:

1. A parent's surplus due to a child is never negative.
2. A parent has a surplus due to a child if and only if the child has a surplus.

The following example code illustrates the basic properties of a SNZI object:

```
shared variable:
    surplus: integer
    initially 0
bool query( )
    return (surplus > 0)
void arrive( )
    surplus ← surplus + 1
void depart( )
    surplus ← surplus − 1
```

In this example, the shared variable "surplus" is incremented by an arrive operation and is decremented by a depart operation. A query operation returns "true" if the value of surplus is greater than zero (i.e., if it is nonzero) and returns "false" if the value of surplus is zero.

In embodiments having the properties described above, the root of the tree will have a surplus if and only if at least one node in the tree does. In some of these embodiments, where the tree may be considered as a single SNZI object, processes may invoke arrive and depart operations on any node in the tree, and may perform query operations directly on the root.

In such embodiments, the complexity of the query operation may be independent of the depth of the tree. To reduce contention, in some embodiments a child may act as a filter for its parent, as described above, thus minimizing the number of operations a child invokes on its parent. Since the tree structure may greatly reduce contention for the root node, in some embodiments a non-scalable SNZI object may be employed at the root without greatly impacting overall scalability of the SNZI tree.

Again note that in various embodiments, a tree of SNZI objects may include a hierarchy of identical SNZI objects, or may employ a different type of SNZI object at the root node than that employed at other levels in the hierarchy. For example, in one embodiment, only the root node includes (and operates on) a nonzero indicator portion. In such embodiments, the tree as a whole serves as a presence indicator; processes may arrive/depart from any node in the tree, and the root may be queried to determine whether the number of arrive operations exceeds the number of depart operations that have already taken effect on the tree as a whole. In these embodiments, non-root nodes of the SNZI tree may operate only on their parent SNZI objects, and not on a nonzero indicator. In another embodiment, a simple counter may be employed at the root node of a SNZI tree, rather than a SNZI node that includes (and operates on) a nonzero indicator portion. In such embodiments, the non-root nodes operate on their parent SNZI objects up to the root node. The value of the simple counter at the root may reflect the filtering of the operations of the non-root nodes below, and its value may be read directly. In yet another embodiment, rather than a tree structure, a single SNZI node, similar to the SNZI root nodes described herein (i.e., one that includes and operates on a nonzero portion) may be included in an application that does not need to know the exact value of a counter, but only whether it is zero or nonzero.

Figure 6:
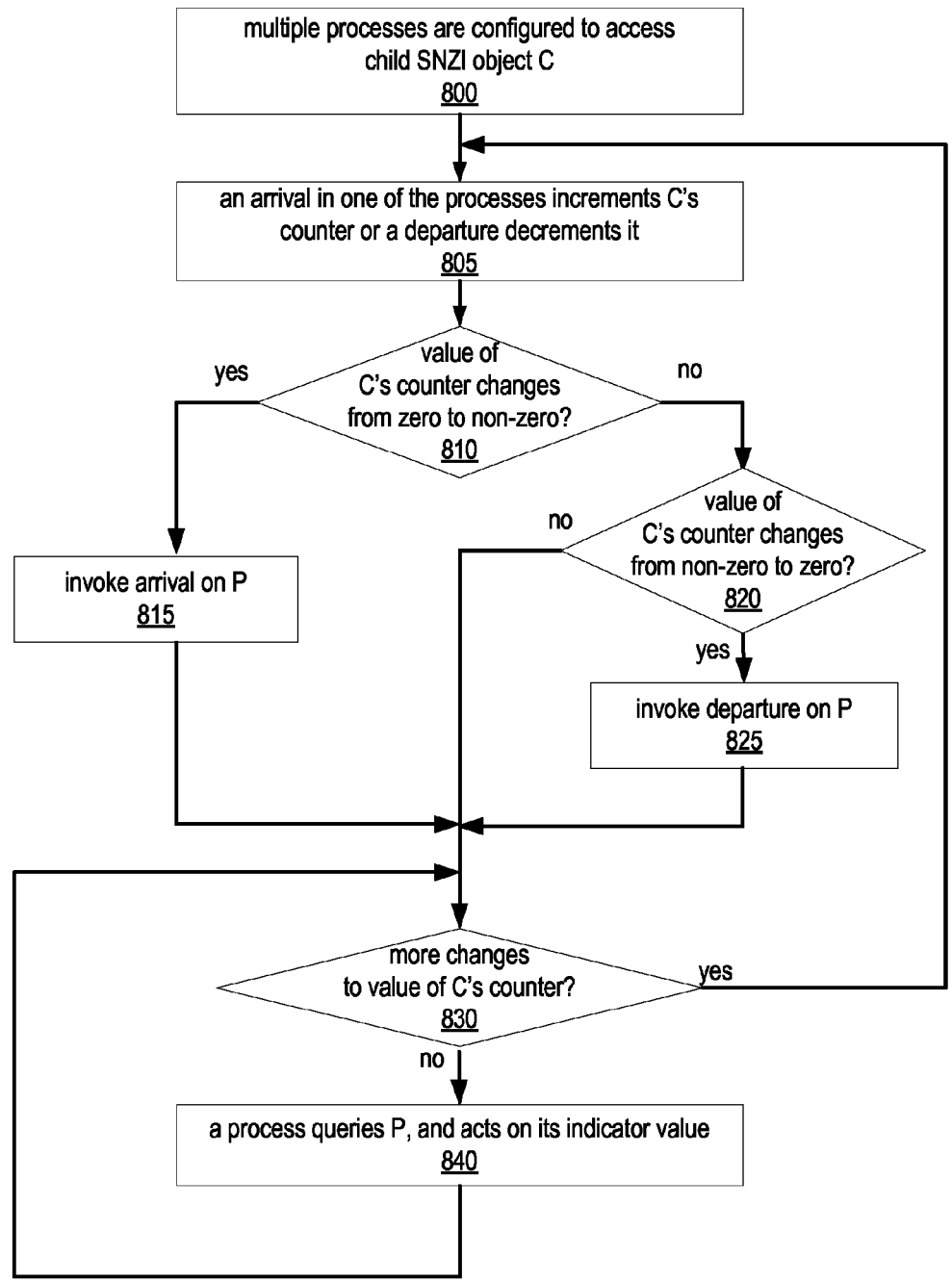
FIG. 6 is a flowchart illustrating the use of a two-level hierarchy of SNZI objects, according to one embodiment.

One example of the use of a SNZI tree structure is illustrated in FIG. 6, according to one embodiment. In this example, multiple processes are configured to access shared SNZI object C, as in 800. SNZI object C, which may be thought of as a child SNZI object, may maintain a counter portion, as described above. In this example, an arriving process increments C's counter or a departing process decrements it, as in 805. As in previous examples, the method may include determining if the value of C's counter changes from zero to a nonzero value or vice versa (as in 810 and 820). This may be determined, in some embodiments, by querying SNZI object C (which returns the value of its nonzero indicator) before and after a change to the counter. In other embodiments, SNZI object C may not include a nonzero indicator portion, and the method may include determining if the value of C's counter changes from zero to a nonzero value or vice versa using other means (e.g., reading the counter portion before and after it is incremented or decremented). If the value of C's counter changes from zero to nonzero, shown as the positive exit from 810, the child SNZI object may invoke an arrival (i.e., a parent.arrive operation) on its parent SNZI object, P, as in 815. Similarly, if the value of C's counter changes from a nonzero value to zero, shown as the positive exit from 820, the child SNZI object may invoke a parent.depart operation on its parent SNZI object, P, as in 825. In this example, other arrive and depart operations may be performed without invoking any operations on P.

As shown in FIG. 6, any query operations may invoke a query on P, as in 840, and the querying processes may act based on its nonzero indicator value, in some embodiments. Additional changes to child SNZI object C and/or queries may be performed, as indicated in feedback loops from 830 to 805, and from 840 to 830, respectively.

The methods illustrated in FIG. 6 may in some embodiments be applied in a rooted tree of SNZI objects in which each child guarantees that the properties listed above are met. For example, the implementation may guarantee that P has a surplus with respect to C if and only if C has a surplus. In other words, amongst operations invoked by C on P, more arrive operations than depart operations have taken effect. Given this guarantee, if any node in the tree has a surplus, then so too does the root of the tree. Thus, processes may invoke arrive operations on any node in the tree, and the query operation of the root of the tree will always return the correct value for the tree as a whole. Thus, the whole tree may in some embodiments be considered as a single SNZI object.

Figure 7:
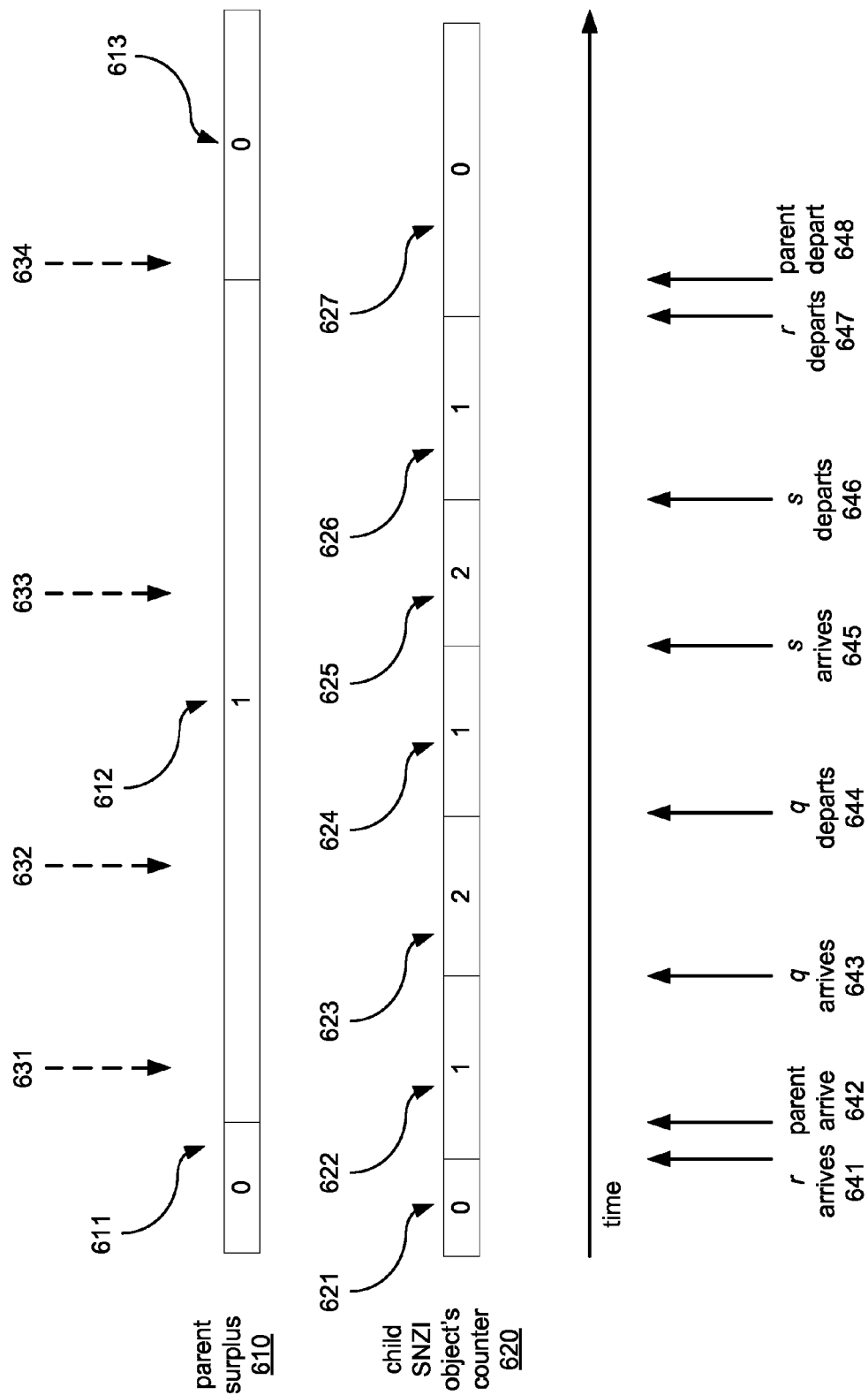
FIG. 7 is a diagram illustrating accesses of SNZI objects by multiple processes over time, according to one embodiment.

This mechanism may be further described using the example illustrated in FIG. 7. As in the previous example, this example includes a child SNZI object C and a parent SNZI object P. In this example, solid vertical arrows indicate process arrivals and departures, and dashed vertical arrows indicate queries, which invoke a query on P. An arriving process that changes C's counter from 0 to 1 invokes a parent.arrive on P, and a departing process that changes C's counter from 1 to 0 invokes a parent.depart operation on P. Other arrive and depart operations may be performed without invoking any operation on P, in some embodiments.

In this example, a process r arrives at 641, incrementing the value of C's counter from 0 (value 621) to 1 (value 622). In response to C's counter value changing from 0 to 1, C invokes a parent.arrive operation on P. At 642, the parent.arrive takes effect, and the parent surplus is changed from a value of 0 (value 611) to 1 (value 612).

In the example illustrated in FIG. 7, another process q arrives at 643, incrementing the value of C's counter from 1 (value 622) to 2 (value 623). Because the counter already contained a nonzero value, no operations are invoked on P in response to this arrival. At 644, process q departs, decrementing the value of C's counter from 2 (value 623) to 1 (value 624). Again, because the value of C's counter remains nonzero, no processes are invoked on P in response to this departure. In this example, another process s arrives at 645 and departs at 646, changing the value of C's counter from value 624 (1) to value 625 (2), and then to value 626 (1), without invoking any operations on P.

At 647, process r departs, decrementing the value of C's counter from 1 (value 626) to 0 (value 627). Because this changes the value of C's counter from nonzero to zero, C invokes a parent.depart operation on P. This parent.depart operation takes effect at 648, resulting in the value of parent surplus 610 changing from 1 (value 612) to 0 (value 613).

In this example, query operations 631, 632, 633, and 634 all return the correct value for parent surplus 610, according to whether there is a surplus of arrive operations on C. For example, query operation 631 returns a value of 1, indicating a parent surplus. At this point, there is a parent surplus because process r has arrived, but has not yet departed. Query operation 632 also returns a value of 1, indicating a parent surplus. At this point, C indicates a value of 2, since processes r and q have arrived, but neither has yet departed. Similarly, query 633 returns a value of 1, while C indicates a value of 2. At this point, processes r, q, and s have arrived, but only process q has departed. Finally, query 634 returns a value of 0, indicating no parent surplus, while C also indicates a value of 0. At this point all three processes that arrived, r, q, and s, have since departed.

Figure 8:
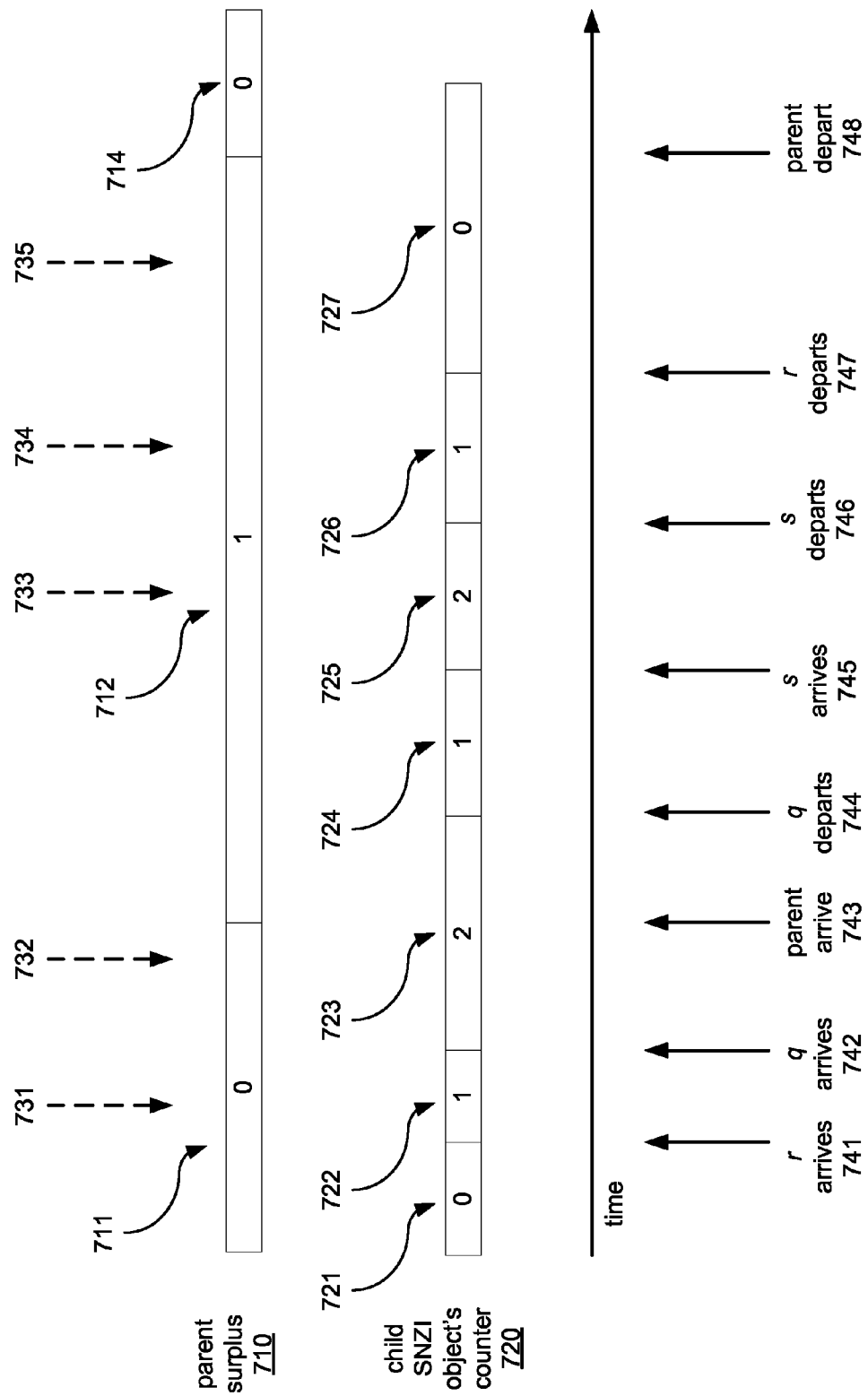
FIG. 8 is a diagram illustrating accesses of SNZI objects by multiple processes over time, according to another embodiment.

FIG. 7 illustrates a simple algorithm for applying a hierarchy of SNZI objects, which may be suitable for many applications. However, in some embodiments, there may exist an unacceptable gap between the time at which a process changes C's counter and the time its operation on P (if any) takes effect. For example, after one process increments C's counter from 0 to 1 and before its arrive operation on P takes effect, another process executing an arrive operation on C may increment the counter and then complete without invoking an arrival on P. A query after this point, but before the first process's arrival on P takes effect, may return a zero (or false) value, indicating (incorrectly) that there is no parent surplus (and thus, no child surplus). This is illustrated by way of example in FIG. 8.

In this example, at 741 a process r may arrive at C, increment C's counter, and invoke an arrive operation on P. A query at 731 may return a value of 0, indicating no parent surplus, since the parent.arrive operation has not yet taken effect. This illustrates that the value returned by the query may lag (or be otherwise out of sync with) the current surplus value, since at this point there have indeed been a surplus of arrivals (1). In this example, before that parent.arrive operation takes effect, a process q may arrive (at 742) and may also increment C's counter. Because the value of C's counter was already non-zero, no other parent operation may be invoked on P. At this point a query 732 may also return a value of 0, since the parent.arrive operation invoked by the arrival of process r has not taken effect and the arrival of process q did not trigger a parent.arrive operation. This again illustrates that the value returned by the query may lag or be out of sync with the current surplus value, since the child surplus at this point is 2 (i.e., processes r and q have arrived, and neither has departed). Note that in other situations, it may be possible for the change in the value returned by the query to lead a corresponding change in actual surplus.

At 743, the parent.arrive operation may finally take effect, and the parent surplus is changed to a value of 1 (value 712). At 744, process q departs, decrementing C's counter, but invoking no operations on P. At 745 and 746, respectively, another process, s, may arrive and then depart, incrementing and then decrementing C's counter (values 725 and 726). These operations do not invoke any operations on P, and queries 733 and 734 return values of 1, indicating parent (and child) surpluses.

At 747, process r departs, decrementing the value of C's counter from 1 (value 726) to 0 (value 727). In response to this change, C invokes a parent.depart operation on P. Before this parent.depart operation takes effect, a query operation 735 returns a value of 1, which is inconsistent with the current parent surplus value, as the child and parent no longer have any surplus arrivals at this point. At 748, the parent.depart operation takes effect, changing the value of parent surplus 710 to 0, and any queries after this point may return a consistent value for the parent surplus.

In some embodiments, applications may require the indicator bit to be stored in the same word as application-specific information. In such embodiments, at the root of the tree a special SNZI root object may separate out the indicator bit, whether or not other SNZI objects (e.g., at other points in a SNZI object tree) include nonzero indicators at all, and whether or not any such indicators are stored separately from the rest of the object(s). Note that the methods described herein may not rely on any special properties of the SNZI object tree (other than rootedness), and the tree may not rely on having a fixed arity or depth. As previously noted, in some embodiments, processes may begin their arrive operations at any node in the tree (as long as the corresponding depart begins at the same node). This flexibility is useful because the optimal shape for the tree may depend heavily on details of both the application and the architecture of the concurrent computing system.

In various embodiments, SNZI objects may be implemented using registers that support read operations (e.g., for queries) and atomic read-modify-write type operations, such as compare-and-swap (CAS) operations, (e.g., for increment, decrement, or write operations). A CAS operation, of the form CAS(a, e, n), atomically compares the contents of address a to "expected value" e. If they are equal, it stores "new value" n to address a, and returns true; otherwise it returns false and does not modify memory. In some embodiments, a query operation may perform a single read, and may extract and return one bit (the indicator) from the value read. This may ensure that the SNZI object can be queried very fast and that it requires only a single bit in the "host" application. This may be important in some applications because the bit may be integrated with an existing variable in which few bits are available.

In some embodiments, the indicator bit may be accessed by means of read, load-linked (LL) and store-conditional (SC) operations. Read and LL return the value of the bit, and SC sets the bit to a specified new value only if no process has performed a successful SC since the previous LL by the same process. Note that an LL/SC operation pair may be considered another atomic read-modify-write type operation. An SC operation may in some cases fail "spuriously"; that is, the condition for success is "only if" not "if and only if". Implementations of SNZI-R objects may obey similar constraints except that an epoch may be stored with the indicator bit, as described below. In such implementations, a query operation may return both values, and the implementation may accesses the pair of values together using read, LL, and SC operations. In some embodiments, the indicator may be integrated into an existing word that already contains a version number and that can be used to implement the LL and SC operations (e.g., using a CAS operation), but because the host algorithm (i.e., the application) can also change the version number, SNZI implementations must tolerate spurious failures. Allowing the algorithm to use LL/SC while requiring it to tolerate spurious failures may abstract these issues away.

In some embodiments, strong well-formedness conditions may be applied as a constraint. For example, a constraint requiring that processes alternate between arrive and depart operations may be useful for some implementations. Similarly, it may be convenient to extend the interface, for example, to require each depart operation to pass in an identifier returned by the corresponding arrive operation. In other embodiments, these additional constraints may be unnecessary.

The weaker semantics of SNZI objects may largely eliminate blocking in concurrent computing applications. For example, a process that relies on another to indicate its presence at the root of the hierarchy may not be required to wait for that process, because in the SNZI implementations described herein, it does not matter if the presence of both or only one is reflected at the root.

While several of the examples above describe a mechanism in which there is little to no difference (e.g., lag or lead time) between the time that an increment/arrive operation is invoked and when it is reflected in the value of the counter and/or a nonzero (or parent surplus) indicator, in some embodiments, the effect of the asynchronous nature of the mechanism may be significant and may result in incorrect, or at least inconsistent, nonzero/surplus indicator values being read by a query. For example, in some embodiments, one process may attempt to atomically increment the counter from 0 to 1, but it may not be immediately successful. In such embodiments, another mechanism may be used to indicate to other processes that such a transition is in progress. Another process that wishes to access the counter may detect that a transition is in progress and may help complete the transition before or after incrementing the counter for themselves, but always before completing its own Arrive operation. This may guarantee that the indicator is set (or a parent is notified with a parent.arrive) by the time the nonzero/surplus indicator is non-zero. In some embodiments, this helping mechanism may involve splitting a 0 to 1 transition into two steps. Two examples of such mechanisms are described in more detail below.

In order to avoid returning incorrect or inconsistent parent surplus values in the hierarchical scheme described above, in some embodiments, an intermediate value may be introduced into the approach. In one embodiment, an intermediate value ½ is introduced when incrementing a counter from 0 to 1. In such embodiments, any process seeing a value of ½ must first "help" the process that set the counter to ½ by invoking a parent.arrive operation and then attempting to change the counter to 1 before retrying its own operation. Thus, before any of the arrive operations on the child complete, at least one of them may have completed a parent.arrive operation (and hence, the parent surplus is non-zero). Because helping may cause a parent.arrive operation to be invoked several times for a single transition of the counter from 0 to 1, processes that invoke a parent.arrive but fail the subsequent attempt to change the counter from ½ to 1 may invoke a "compensating" parent.depart operation, in some embodiments. In such embodiments, there may be a compensating parent.depart operation for all but one parent.arrive operation. The remaining parent.arrive may be matched by a parent.depart operation that is invoked by a process that changes the counter from 1 to 0 (in a depart operation).

Figure 9:
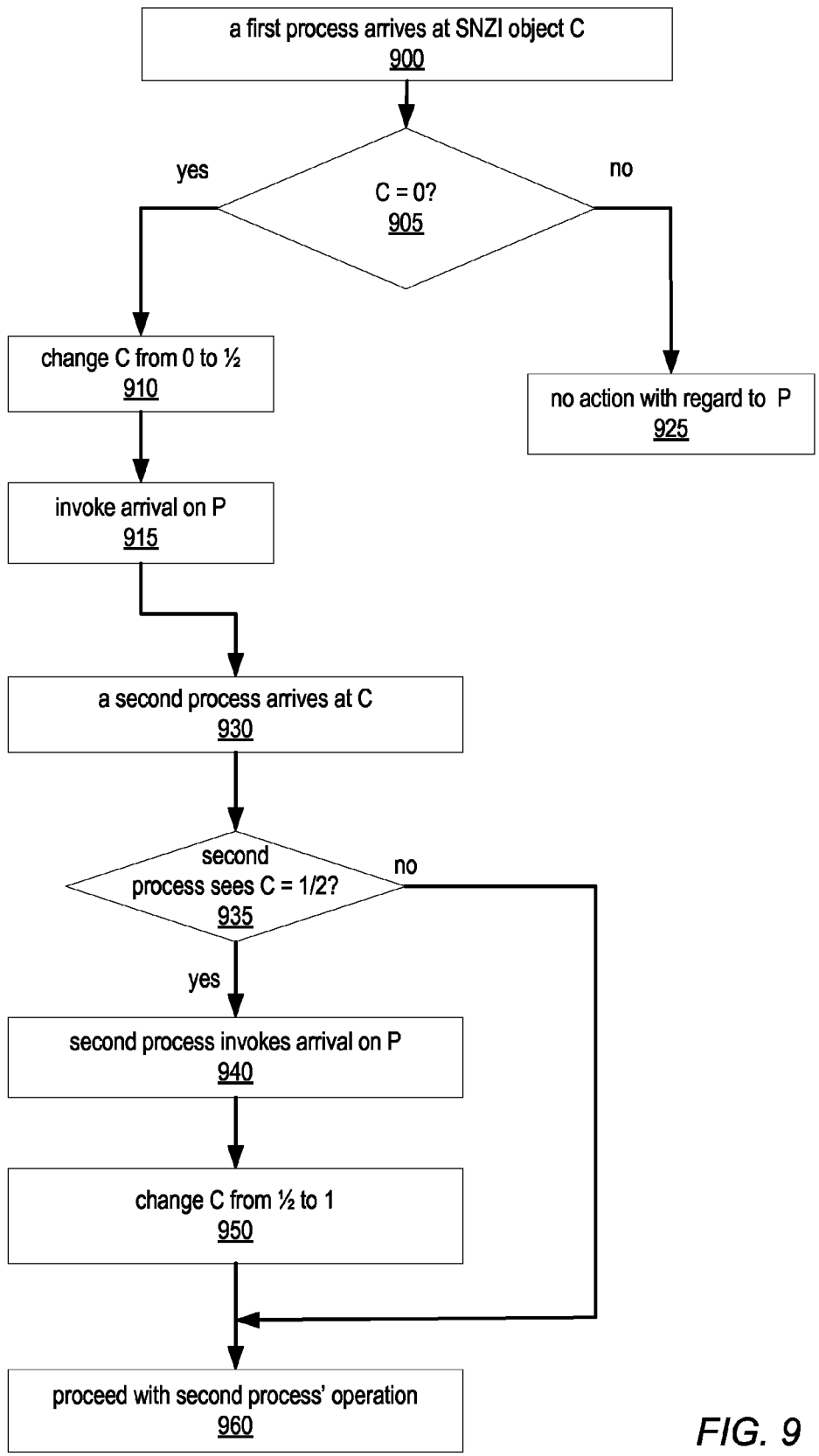
FIG. 9 is a flowchart illustrating the use of a helping mechanism for SNZI objects accessible by multiple processes, according to one embodiment.

FIG. 9 illustrates one example of the application of a SNZI implementation that includes the use of such an intermediate value. In this example, a first process arrives at SNZI object C, as in 900. If the process sees that the value of C, before it increments C, is 0, shown as the positive exit from 905, the process may change the value of C from 0 to ½, as in 910. SNZI object C may then invoke a parent.arrive operation on P, as in 915. If the value of C seen by the first process, before incrementing, is not 0, shown as the negative exit from 905, no action may be taken with regard to P, as in 925. (Note that this example assumes that no other process has arrived at C, but not completed its parent.arrive and/or increment operations, prior to the arrival of the "first process" at 900.)

In this example, a second process arrives at C, shown as 930. If this second process sees that the value of C is ½, shown as the positive exit from 935, the method may include the second process invoking another arrive operation on P to help the first process, as in 940. The second process may then change the value of C from ½ to 1, as in 950, and may proceed with its own operation, as in 960. If the value of C seen by the second process is not ½, shown as the negative exit from 935, the method may proceed with the second process' operation, as in 960, without invoking another arrive operation on P.

Although not shown in FIG. 9, when a departing process decrements the counter to 0, it may invoke a parent.depart operation on P to compensate for the arrive operation previously executed on P as a result of the transition from 0 to 1 (via ½). However, because of the helping mechanism, several processes may execute an arrive operation on P as the result of one transition from 0 to 1 (again, via ½). To ensure correct responses from query operations, the algorithm may ensure that when C has no surplus, P has no surplus with respect to C.

Thus, in some embodiments, any "additional" arrive operations performed as a result of the helping mechanism may be compensated for. In one embodiment, processes that see the counter as ½, invoke a parent.arrive operation on P, and then fail to increase the counter from ½ to 1, subsequently invoke a parent.depart operation on P to compensate. Rather than doing so immediately, they may record the number of times this occurs (e.g., using an "undoArrive" count), and may execute that number of depart operations on P just before returning.

In some embodiments, if these compensating depart operations were performed immediately, rather than being deferred, the following could happen: process r increments the counter to ½, and then process q observes the counter as ½. Both processes invoke a parent.arrive operation on P. Subsequently, r changes the counter to 1, completes its operation, and subsequently invokes a depart operation on C. This decrements the counter to 0, and therefore executes a depart operation on P. A query operation at this point returns 1 (true), because P still has a surplus. Because r has completed one arrive operation and one depart operation on C, this query operation should take into consideration that q's arrive operation on C has already taken effect. However, if q now invokes a parent.depart operation on P to compensate for its previous arrive operation, a subsequent query will return 0 (false). Because q's arrive operation on C is deemed to have taken effect already, and q has not yet invoked a depart operation on C, this would be incorrect. The method described above, in which compensating depart operations are deferred, may not exhibit this problem.

In some embodiments, a process arriving at C may have at most two "extra" arrives on P. In such embodiments, when a process sees the counter as ½, if an undoArrive count is 2, it simply decrements the undoArrive count, rather than invoking an arrive operation on P. This may eliminate one arrive-depart pair, which is safe because the process still has one extra arrive operation on P. In addition to further reducing contention for P, this mechanism may result in the property that P's counter is bounded by twice the number of processes, whereas it is unbounded in the embodiment presented above.

Figure 10:
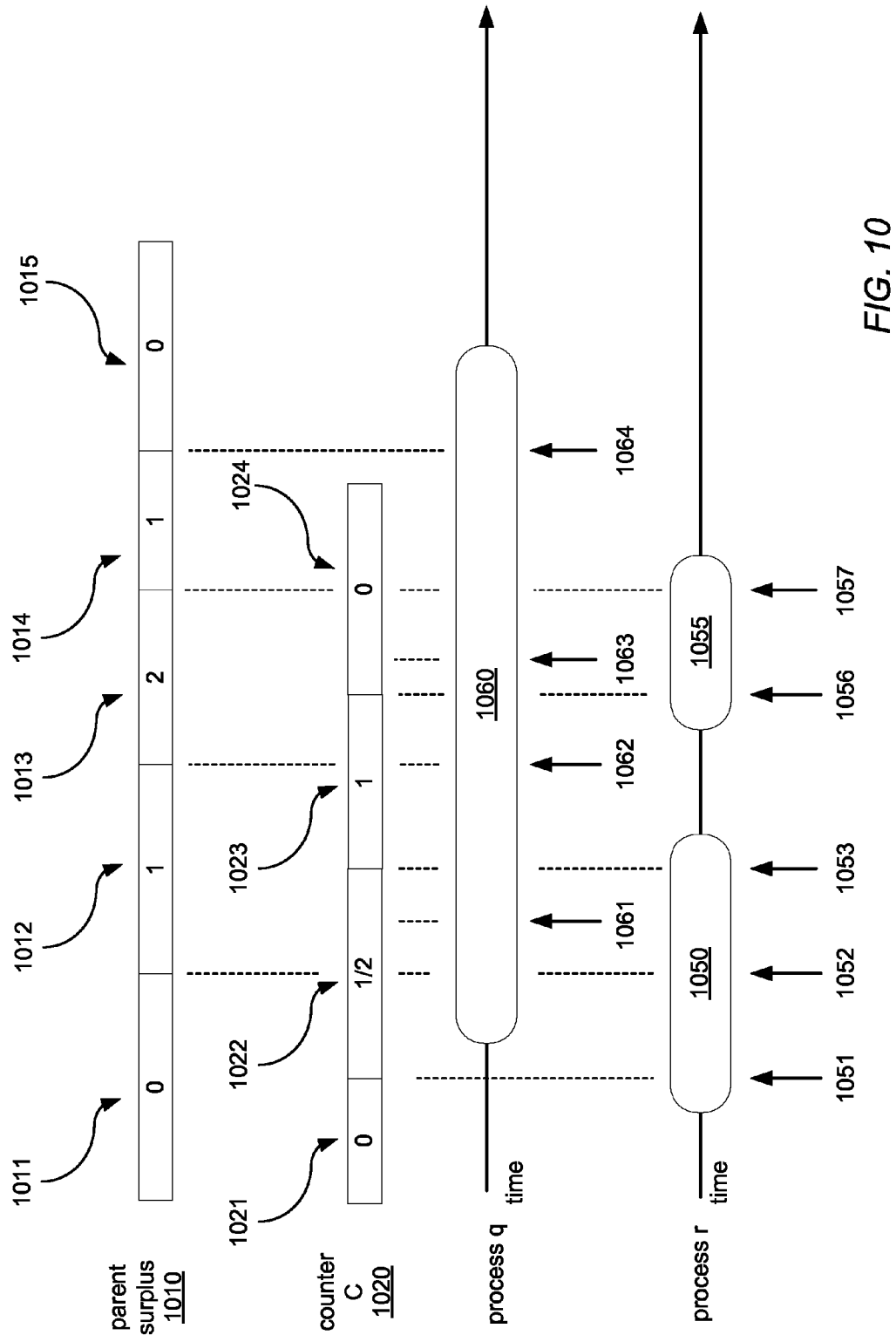
FIG. 10 is a diagram illustrating arrive operations and depart operations on SNZI objects by multiple processes over time, according to one embodiment.
Figure 11:
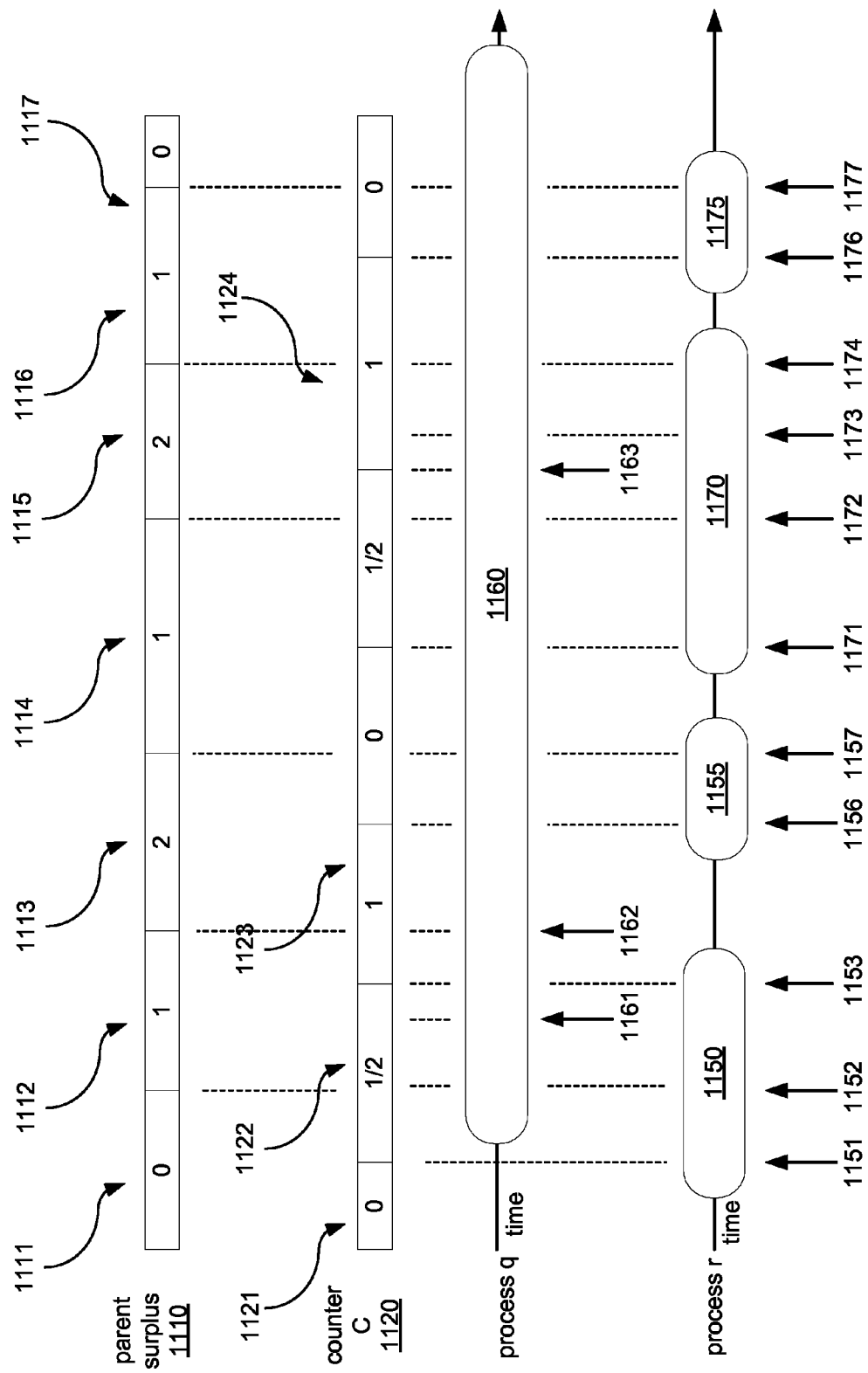
FIG. 11 is a diagram illustrating arrive operations and depart operations on SNZI objects by multiple processes over time, according to another embodiment.

As described above, in embodiments in which compensating parent.depart operations are not deferred, the surplus of the parent may "flicker" between 0 and 1 while an arrive is in progress. This is illustrated in FIG. 10. In other embodiments flicker may be caused by a helping process that is so delayed that it attempts to change C's counter from ½ to 1 during a later arrive operation than the one that wrote the value of ½ that it originally read (e.g., a late helper), as illustrated in FIG. 11.

In the example illustrated in FIG. 10, process r includes an arrive operation 1050 and a depart operation 1055. Arrive operation 1050 increments counter C from 0 to ½ using CAS(C, 0, ½) at 1051. Arrive operation 1050 also invokes a parent.arrive at 1052, incrementing parent surplus 1010 from 0 (value 1011) to 1 (value 1012); and then increments counter C from ½ to 1, using CAS(C, ½, 1) at 1053. Before process r increments C from ½ to 1, however, process q arrives (illustrated as arrive operation 1060). Process q reads the value of C (at 1061), sees that it is ½, and invokes a parent.arrive operation at 1062 to help process r. This increments parent surplus 1010 from 1 (value 1012) to 2 (value 1013).

When process r completes its operation, it begins depart operation 1055, which includes a decrement operation on the counter at 1056, using CAS(C, 1, 0). When process q subsequently attempts to increment C from ½ to 1 (helping process r) at 1063, this operation, CAS(C, ½, 1) fails because C is no longer ½ at this point, having been incremented to 1 by process r at 1053 and then decremented to 0 by process r at 1056. Process r, having decremented C from 1 to 0, then invokes a parent.depart operation at 1057, which decrements parent surplus 1010 from 2 to 1. Finally, after completing its own operation, process q invokes a parent.depart operation at 1064, decrementing parent surplus 1010 from 1 (value 1014) to 0 (value 1015).

In the example illustrated in FIG. 10, the arrive operation of q cannot be linearized. In this example, the arrive operation must be linearized before r completes its depart operation 1055 because at that point, the parent has a surplus, and thus by property 2 above, so does the child (which must be due to q's arrive operation 1060). On the other hand, the arrive operation of q must not be linearized before q's parent.depart operation 1064 because after that point, the parent has no surplus. In some embodiments, read operations that are immediately followed by successful CAS operations may be ignored.

As seen in the example illustrated in FIG. 10, a "flicker" in the value of the parent surplus may be caused by a process that invokes a helping parent.arrive operation and subsequent parent.depart operation.

In the example illustrated in FIG. 11, process r includes two sets of arrive/depart operation pairs. The first arrive operation 1150 increments C using CAS(C, 0, ½) as before (at 1151), invokes a parent.arrive operation at 1152 to increment parent surplus 1110 from 0 to 1, and increments C from ½ to 1 using CAS(C, ½, 1) at 1153. As in the previous example, before process r increments C from ½ to 1 at 1153, process q arrives (arrive operation 1160) and reads C (at 1161). Seeing that the value of C is ½, process q invokes a parent.arrive operation at 1162, to help process r. However, in this example, process q does not increment C from ½ to 1 right away, but delays this helping increment until 1163. By then, process r has completed depart operation 1155 (which decrements the counter to 0 and the parent surplus to 1) and has begun a second arrive operation 1170. Arrive operation 1170 increments C from 0 to ½ using CAS(C, 0, ½) at 1171, and invokes a parent.arrive operation at 1172. However, because process q was late in its attempt to help process r's first arrive operation, process q has just completed incrementing C from ½ to 1 at 1163 when process r's second arrive operation attempts to increment C from ½ to 1 at 1173. This operation by process r, using CAS(C, ½, 1), fails, and process r invokes a compensating parent.depart operation at 1174. Finally, process r's second depart operation 1175 decrements C using CAS(C, 1, 0) at 1176, and invokes another parent.depart operation at 1177.

In the example illustrated in FIG. 11, again the arrive operation of q cannot be linearized. In this example, the arrive operation must be linearized before r completes its first depart operation 1155 because at that point, the parent has a surplus, and thus, so does the child (which must be due to q's arrive operation 1160). On the other hand, the arrive operation of q must not be linearized before r completes its second depart operation 1175 because after that point, the parent has no surplus.

As seen in the example illustrated in FIG. 11, a "flicker" in the value of the parent surplus may be caused late helper process.

In some embodiments, the "flicker" illustrated in FIGS. 10 and 11 may not be a problem for the targeted applications, although it violates property 2 above. In other embodiments, the algorithm shown below may be used to avoid the first problem by deferring compensating parent.depart operations until the end of an arrive operation (using the undoArrive variable), and to avoid the second problem by adding a version number to C that is incremented, for example, in response to any transition of C from 0 to ½. Because compensating parent.depart operations are deferred, the parent's surplus may be unbounded even if the child's surplus never exceeds 1. For example, a single arrive operation may, in some embodiments, try and fail to help arbitrarily many other arrive operations.

As noted above, in some embodiments, an arrive operation may invoke at most two "extra" parent.arrive operations. In such embodiments, if undoArrive is 2 when a process would invoke a parent.arrive operation, the process instead may decrement undoArrive, eliminating one arrive-depart pair (thereby further reducing contention) on the parent. As noted above, this may in such embodiments be safe because the process has done at least one extra parent.arrive operation, so the parent is guaranteed to have a surplus until the end of the arrive.

The following code illustrates one example of an implementation of a hierarchical (i.e., non-root node) SNZI object. In this example, the SNZI object includes a shared variable, X (which includes a counter portion, c; and a version number, v), and a shared variable "parent" (which is a linearizable SNZI object).

```
shared variables:
    X = (c, v): (N ∪ {½ }, N); initially (0, 0)
    parent: scalable indicator
arrive
    succeed ←false
    undoArrive ←0
    while (!succeed)
        x ←read(X)
        if x.c ≥ 1 then
            if CAS(X, x , (x.c + 1, x.v)) then
                succeed ←true
        if x.c = 0 then
            if CAS(X, x , (½, x.v + 1)) then
                succeed ←true
                x ←(½, x.v + 1)
        if x.c = ½ then
            parent.arrive
            if !CAS(X, x , (1, x.v)) then
                undoArrive = undoArrive + 1
    while (undoArrive > 0) do
        parent.depart
        undoArrive = undoArrive − 1
depart
    while (true) do
        x ←read(X)        /* assert X.c ≥ 1 */
        if CAS(X, x , (x.c − 1, x.v)) then
            if x.c = 1 then
                parent.depart
            return
```

In the example code above, an arrive operation resets a "succeed" variable to "false" and resets an undoArrive variable to 0. The arrive operation then loops until it is successful (i.e., until succeed is true). Within the arrive operation's loop, the shared variable, X, is read and the value of the counter portion is determined. If the counter portion value is already greater than or equal to 1 (i.e., nonzero and not ½), the arrive operation performs an update using a CAS operation (incrementing the counter but not changing the version portion), and the arrive operation succeeds (setting succeed to true). It then proceeds by invoking a parent.arrive, and then attempts to change the counter from ½ to 1. Since succeed is already true, the while loop is exited regardless of whether this update to the counter succeeds. That arrive operation returns after undoing any extra arrives (as indicated by the count maintained by the undoArrive variable) by departing from the parent. If the counter portion value is zero, it is written to a value of ½, using a CAS operation, the version portion is updated, and the arrive operation succeeds (setting succeed to true). If the counter portion value was read as ½, a parent.arrive operation is invoked (as a helping mechanism), and an attempt is made to update the counter portion value to 1, using a CAS operation. If the CAS operation succeeds, the counter value is updated to 1, and the version portion is incremented. The arrive operation's own increment may then be performed (e.g., by repeating the arrive operation). If the CAS operation does not succeed, undoArrive is incremented. Once the shared variable, X, is successfully updated (i.e., when the arrive operation's loop is exited), a parent.depart operation is invoked.

In the example code above, a depart operation reads the SNZI object and attempts to decrement the counter portion using a CAS operation. If the CAS operation succeeds, and the previous counter value was 1, a parent.depart operation is invoked. Based on the well-formedness constraints described earlier, it is assumed that the counter value is greater than or equal to 1 whenever a depart operation is called.

As noted above, in some embodiments, a root node may be implemented differently than other hierarchical nodes in a SNZI object tree. Because this node provides the query operation, it must adhere to the constraints described above. In some embodiments, the root node operates on an indicator bit, called I, that is separated out from the rest of the object. This bit may in some embodiments need to be stored in the same memory location as application-specific data. The value of this bit is true when the number of arrive operations that have taken effect exceeds the number of depart operations that have done so, and is false otherwise. This bit may in some embodiments be accessed using read, LL, and SC operations, as described above. The object may also support the use of a write operation, which may be implemented using LL and SC in a retry loop.

As in the hierarchical node presented above, the root node may maintain a counter, arriving processes may increment the counter, and departing processes may decrement the counter. In addition, transitions on the counter from 0 to 1 may trigger setting I and transitions from 1 to 0 may trigger clearing I. Processes that increment the counter after a process that increments it from 0 to 1 and before that process sets I may in some embodiments "help" by also setting I. In some embodiments, to avoid unnecessary cache invalidations of I, an "announce" mechanism may be introduced, which may perform a function similar to that of the intermediate value described above with regard to the hierarchical nodes.

In one such embodiment, a process incrementing the counter from 0 to 1 may set an announce bit, a, in the counter word. This announce bit may indicate to other processes that a 0 to 1 transition is in progress so that they may help complete the transition. Processes that subsequently increment the counter may preserve the announce bit, which may not be cleared before I is set. All processes that set or preserve the announce bit as true may set I before attempting to clear the announce bit. This may ensure that before any process completes its arrive operation, the I bit is set, as required. In such embodiments, I may stay set until a departing process that has decremented the counter to 0 clears it.

A departing process that decrements the counter to 0 may in some embodiments clear I using an LL/SC loop. The process may read the counter between the LL and SC, and terminate without attempting the SC if the counter has changed. In some embodiments, a version number may be introduced in the SNZI object (e.g., stored in the same variable as the counter) to ensure that any change is detected. In such embodiments, if the SC succeeds, there is no risk that some process has completed another arrive, which would result in a query operation incorrectly returning false.

In one example, if the value of the counter is zero, then there is no process that has incremented the counter in an arrive operation and not subsequently decremented it again in a depart operation. Thus, the arriving process may be required to increment the counter after the departing process checks to see that the counter is 0, and it may be required to complete before the SC operation. As described above, this process, or some other process, may set I before the arrive operation completes, which may cause the SC to fail, resulting in a contradiction. In some embodiments, an unconditional store may be implemented by using LL/SC operations in a retry loop. Such a loop is not shown in the example code included herein.

As noted above, in some embodiments, application-specific information stored together with the indicator bit may change, causing SC to fail. In some embodiments, the only effect of a spurious failure is to cause another iteration of a small loop, which may degrade performance, but may not affect correctness.

The following code illustrates one example of an implementation of a root SNZI object. In this example, the object includes a shared variable, X (which includes a counter portion, c; and an announce bit, a), and a shared variable I (which is a Boolean indicator portion).

```
shared variables:
    X = (c, a): (N, boolean); initially (0, false)
    I : boolean; initially false
arrive
    repeat
        x ←read(X)
        if x.c = 0 then
            x' ←(1, true)
        else
            x' ←(x.c + 1, x.a)
    until CAS(X, x , x')
    if x'.a then
        store(I , true)
        CAS(X, x', (x'.c, false))
depart
    repeat
        x ←read(X)      /* assert X.c ≥ 1 */
        if CAS(X, x , (x.c – 1, false)) then
            if x.c ≥ 2 then return
            repeat
                LL(I )
                if read(X).c ≠ 0 then return
                if SC(I , false) then return
query
    return I
```

In the example code above, an arrive operation may read the value of the counter portion. If the counter value is zero, it may be set to 1 and the announce bit may be set to true. If the counter value is nonzero, it may be incremented and the value of the announce bit may be preserved. After the CAS operation successfully updates the shared variable, X, if the announce bit is true, the indicator I may be set to true and the announce bit may be cleared (using another CAS operation).

In the example code above, a depart operation may read the value of the counter portion (and may assume that it is always greater than or equal to 1). An attempt may be made to decrement the counter portion using a CAS operation. If the CAS operation succeeds, it also clears the announce bit. If the counter value was greater than or equal to 2 prior to the decrement, the operation returns after updating the counter and announce bit. Otherwise, the operation tries to clear I if and only if the counter value is still 0. As shown above, this may be done in a loop, in case the SC spuriously fails and needs to be retried. Within the loop, I is read using an LL operation, then the counter is read. If and only if the read value of the counter is 0, an SC operation is used to attempt to clear I.

In the example code above, a query operation returns the value of I. Note that in the implementation above, the value of I may "flicker" and therefore, the algorithm may not be linearizable. In order to address this potential issue, in some embodiments a version number may be added to the shared variable, as described below.

The following code illustrates another example of an implementation of a root SNZI object. In this example, the object includes a shared variable, X (which includes a counter portion, c; an announce bit, a; and a version number, v), and a shared variable I (which is a Boolean indicator portion).

```
shared variables:
    X = (c, a, v): (N, boolean,N); initially (0, false, 0)
    I : boolean; initially false
arrive
    repeat
        x ←read(X)
        if x.c = 0 then
            x' ←(1, true, x.v + 1)
        else
            x' ←(x.c + 1, x.a, x.v)
    until CAS(X, x , x')
    if x'.a then
        write(I , true)
        CAS(X, x', (x'.c, false, x'.v))
depart
    repeat
        x ←read(X)         /* assert X.c ≥ 1 */
        if CAS(X, x , (x.c − 1, false, x.v)) then
            if x.c ≥ 2 then return
            repeat
                LL(I )
                if read(X).v ≠ x.v then return
                if SC(I , false) then return
query
    return read(I )
```

In the example code above, the arrive, depart, and query operations are substantially similar to those of the previous example. However, the arrive operation increments a version portion of the SNZI object upon successful operation and preserves the version portion otherwise. In this example, the depart operation checks to see if the version portion has changed (rather than checking for a counter value of 0) in its LL/SC loop, so that it will not attempt to clear I if the counter was changed to a nonzero value and then changed back to zero. Clearing I in such a case may allow non-linearizable executions in which I "flickers".

Note that while in the examples above, a helping mechanism employing an intermediate value is applied to hierarchical (non-root) SNZI nodes and a helping mechanism employing an announce bit is applied to SNZI root nodes, in other embodiments, either helping mechanism may be applied to any of the nodes in a tree of SNZI objects, or another suitable helping mechanism may be applied to any of the nodes.

For example, the following code may be used to implement a hierarchical (non-root) node, in some embodiments. In this example, an announce bit mechanism similar to the one described in the root-node algorithm above may be employed. In this example, the node may never need to invoke more than one compensating parent.depart operation. In the example code below, the object includes a shared variable X (which includes a counter portion, c; and an announce bit, a), and a shared variable "parent", which is a scalable nonzero indicator.

```
shared variables
    X = (c, a): (N, boolean)
    parent : scalable indicator
arrive
    repeat
        oldx ←read(X)
        if oldx.c = 0
            newx = (1, true)
        else
            newx = (oldx.c+1, oldx.a)
    until CAS(X, oldx, newx)
    if newx.a
        parent.arrive
        repeat
            oldx ←read(X)
            if !oldx.a
                parent.depart
                return
        until CAS(X, oldx, (oldX.c, false))
depart
    repeat
        oldx ←read(X)        // assert oldx.a = false
    until CAS(X, oldx, (oldx.c−1, oldx.a))
    if oldx.c = 1
        parent.depart
```

In the example code above, an arrive operation may check the value of the counter portion before incrementing it. If its value is zero, it may be set to 1, and the announce bit may be set to true. If its value is nonzero, it may be incremented, and the current value of the announce bit may be preserved. A CAS operation may be used to complete the update of the counter and/or announce bit. If the announce bit is set after the successful CAS operation (e.g., if it was set by the arrival or was already set), a parent.arrive operation may be invoked. The arrive operation may then repeatedly attempt to clear the announce bit using a CAS operation, invoking a parent. Depart operation (and returning) if it finds that the announce bit was already cleared by another process.

In the example code above, a depart operation may decrement the counter portion, preserving the value of the announce bit, and if the counter value was 1 before it was decremented, the depart operation may also invoke a parent.depart operation.

The SNZI objects described herein may in some embodiments be used to improve the performance and scalability of hybrid transactional memory (HyTM) systems, in which transactions may be executed either directly by hardware or by using software. HyTM systems may support an incremental approach to the adoption of hardware transactional memory (HTM) by allowing any transaction to be executed using HTM if it is available and effective, or using software transactions otherwise. In such embodiments HyTM systems may include mechanisms to ensure that hardware transactions detect conflicts with software transactions. In some embodiments, HyTM systems may include a table of "ownership records" (orecs), and ownership of each memory location is controlled by one of these orecs. Software transactions may indicate ownership of a location by modifying the corresponding orec, and the code to be executed using hardware transactions is augmented to check appropriate orecs for (potential) conflicts.

In many cases, SNZI object may be suitable for use in such HyTM systems. For example, if a software transaction performs an arrive operation before beginning and a depart operation after completing, a hardware transaction that calls a query operation and receives a "false" may infer that there are no software transactions in progress. Thus, the hardware transaction may avoid the significant overhead of detecting conflicts with software transactions for each transactional load or store. This assumption may in many embodiments be a safe one because if a software transaction subsequently begins and completes its arrive operation before the hardware transaction completes, the arrive will cause a memory location (e.g., that of the indicator) previously read by the hardware transaction's query operation to change, which will cause the hardware transaction to abort.

In addition, a SNZI implementation may avoid modifying the memory location(s) read by a query operation except when a surplus changes from 0 to 1 or from 1 to 0, as describe above. Thus, if a hardware transaction's call to a query operation indicates that the surplus is nonzero (and thus that it must check for conflicts with software transactions on each load and store), subsequent arrive and depart operations by software transactions need not always cause the hardware transaction to fail. In contrast, if a simple counter were used instead of a SNZI object, such operations would cause the counter to change, causing the hardware transaction to abort, often unnecessarily. In addition, for workloads or environments in which many transactions are executed in software, a simple counter quickly inhibits scalability. By using a SNZI object both problems may be eliminated.

SNZI objects may in other embodiments be used to improve "semi-visible" read-sharing mechanisms, which allow a transaction that intends to write to a location to determine whether any transactions are reading the location. For this purpose, it may not be necessary to know which transactions are readers nor how many reading transaction there are, just whether the number of readers is nonzero. In embodiments employing SNZI objects (e.g. when a SNZI object operates on a reading indicator bit residing in an ownership record), if software transactions perform an arrive operation before reading from the location and a depart operation when they end, a transaction that wants to modify the location may detect conflicts with readers by performing a query operation. In addition to improving scalability under heavy read sharing by software transactions, using a SNZI object instead of a simple counter may in some embodiments avoid unnecessarily aborting hardware transactions. In particular, a hardware transaction that wishes to read a location may query its associated SNZI object, and if it indicates that there are a nonzero number of software readers, it is safe for the hardware transaction to read share the location. This remains safe if another software transaction arrives, as described above. By contrast, this arrival would always cause the hardware transaction to fail if a simple counter were used to record the number of readers, rather than a SNZI object.

In this application of SNZI objects, if a location is being read shared by some transactions, another transaction may modify this location (thereby invalidating the reading transactions). After the location has been modified, it may be desirable to allow read sharing on the location again, without waiting for all of the previous readers to depart. To support this, in some embodiments a reset operation may be introduced and the query operation may be modified to determine whether any readers have arrived since the previous reset (if any) that have not yet departed. The resulting object, SNZI-R is described in more detail below.

A SNZI-R implementation may be similar to the SNZI implementation described above, but may include an associated epoch, in some embodiments. In such embodiments, "Arrive" and "Depart" operations may pertain to a particular "epoch", and the query operation may determine whether the number of arrive operations exceeds the number of depart operations for the current epoch. A reset operation may be supported that causes a transition to a new epoch. In some embodiments, epochs may be assumed to be totally ordered.

The following example code illustrates the basic properties of a SNZI-R object. In this example, the object includes a shared variable, S, which is implemented as a record that includes a variable "epoch" and a variable "surplus".

```
type SNZI_R type =
    record
        Epoch: integer
        Surplus: integer
shared variable:
    S: SNZI_R type
        initially (0, 0)
(bool,integer) Query( )
    return
        (S.Surplus > 0, S.Epoch)
integer Arrive( )
    S.Surplus ←S.Surplus + 1
    return S.Epoch
void Depart(e: integer)
    if S.Epoch = e then
        S.Surplus ←S.Surplus − 1
bool Reset(e: integer)
    if e > S.Epoch then
        S = (e, 0)
        return true
    else
        return false
```

As illustrated in the example code above, SNZI-R objects may have a slightly different interface than SNZI objects. For example, while the "Arrive" operation above returns the current epoch value, an internal arrive operation may accept an epoch as a parameter and may not return anything. In other words, it may arrive to the specified epoch (incrementing the surplus) if it is current, and do nothing otherwise. This change may make it easier to implement the algorithm recursively and may also permit additional optimizations, as described below.

As seen in the example code above, an indicator word of a SNZI-R root node may store the current epoch and an indication of whether there is a surplus for that epoch. In this example, a successful reset operation may simply change to the new epoch specified and set the surplus indicator to false. In some embodiments, the SNZI-R non-root nodes may have an epoch stored together with their counters. If a SNZI-R non-root node contains an epoch other than the current one, this may be logically equivalent to containing the current epoch with the counter being 0. Therefore, steps of operations for an epoch e that encounter a node with an earlier epoch may simply update the node as if it contained epoch e and counter 0. If such a step is itself for an epoch prior to the current one, such a modification may have no effect, as the node may still logically contain the current epoch and a counter value of 0 after the modification.

In some embodiments, an "Arrive" operation for a SNZI-R object, such as that described by the example code above, may be implemented using a simple wrapper. Such an Arrive operation may begin by invoking a query operation (on the root node) to determine the current epoch, "e", and then may invoke an internal arrive(e) operation on some node. The arrive operation may be deemed to have joined that epoch, whether the epoch remains current or not. If it does, then the arrive operation may behave essentially as in the SNZI algorithm above, except that it is modified to treat variables with earlier epochs in them as if they contained epoch e and a counter of 0.

If, on the other hand, a reset operation causes a change to a new epoch (i.e., if the reset operation ends the current epoch e and replaces it with a new epoch), all changes made by operations for previous epochs may become irrelevant, because the variables containing previous epochs become logically equivalent to the new epoch (with counter value 0) as soon as the reset takes effect. In this case, the arrive operation may be considered to have arrived at the old epoch e, because depart operations for previous epochs have no effect. There may be no effect on any variables of the shared object that they modify in the new epoch, since they have an out-of-date epoch both before and after the modification. In this case, a concurrent arrive operation may be linearized immediately before the reset operation, because depart operations for previous epochs have no effect according to the specification, and will have no effect on the shared object because any variables they modify have an out-of-date epoch both before and after the modification. The same observation may enable various optimizations that allow an operation to return immediately when it determines that its epoch is no longer current.

Note that in some embodiments, the following constraint may be applied to SNZI-R implementations: for any epoch e, the number of Depart(e) operations invoked before any point in time is at most equal to the number of arrive operations that completed before that time and returned e.

The following code illustrates one example of an implementation of a hierarchical SNZI-R object. In this example, the object includes a shared variable, X (which includes a counter portion, c; a version number, v; and an epoch portion, e), and a shared variable "parent" (which is a linearizable SNZI-R object).

```
shared variables:
    X = (c, v, e): (N ∪ {½}, N, N); initially (0, 0, 0)
    parent: scalable resetable indicator
arrive (e)
    succeed ←false
    undoArrive ←0
    while (!succeed)
        x ←read(X)
        if x.e > e then return
        oc ←(x.e < e) ? 0 : x.c
        if oc ≥ 1 then
            if CAS(X, x , (oc + 1, x.v, e)) then
                succeed ←true
        if oc = 0 then
            if CAS(X, x , (½, x.v + 1, e)) then
                succeed ←true
                x ←(½, x.v + 1, e)
                oc ←½
        if oc = ½ then
            parent.arrive(e)
            if !CAS(X, x , (1, x.v, e)) then
                undoArrive = undoArrive + 1
        while (undoArrive > 0) do
            parent.depart (e)
            undoArrive = undoArrive − 1
depart (e)
    while (true) do
        x ←read(X)          /* assert X.c ≥ 1 */
        if x.e ≠ e then return
        if CAS(X, x , (x.c − 1, x.v, e)) then
            if x.c = 1 then
                parent.depart (e)
            return
query
    return parent.query
reset (e)
    return parent.reset (e)
```

In the example code above, an arrive operation first checks for an epoch match by reading the value of the SNZI-R object. If the epoch specified in the arrive operation is an older epoch (i.e., the arrive was meant for a previous epoch) than the epoch of the SNZI-R object, no action may be taken. If the epoch specified in the arrive operation is newer than the epoch of the SNZI-R object, the counter portion of the SNZI-R object may be treated as if it has the value 0 with respect to the epoch e. That is, the arrive operation may try setting the counter to ½, incrementing the version number, and setting the epoch to e. If the epoch specified in the arrive operation is equal to the epoch of the SNZI-R operation, the arrive operation may proceed in a manner similar to that of the arrive operation of a SNZI object that does not support reset, with several additions: the epoch value is preserved, and calls to invoke a parent.arrive operation and/or a parent.depart operation include the epoch as a parameter.

In the example code above, a depart operation first checks for an epoch match. If the epoch specified in the depart operation does not match the epoch of the SNZI-R object, no action may be taken. If the epochs do match, the depart operation may decrement the counter and invoke a parent.depart operation, as in previous examples, with the addition that the parent.depart operation includes the epoch as a parameter. Note that in other embodiments, the reset and query operations may only be applied to a SNZI-R root node, and therefore, may not apply to hierarchical SNZI-R nodes in a tree of SNZI-R nodes.

In the example code above, a reset operation takes an epoch as a parameter and invokes a parent.reset operation, passing the epoch as a parameter to the parent.reset operation. In this example, a query operation does not have any additional input parameters, but returns the value of a parent.query operation.

The following code illustrates an example of an implementation of a SNZI-R root node object. In this example, the object includes a shared variable, X (which includes a counter portion, c; an announce bit, a; a version number, v; and an epoch portion, e), and a shared variable I (which includes a Boolean indicator portion, and an epoch portion).

```
shared variables:
    X = (c, a, v, e): (N, boolean, N, N), initially (0, false, 0, 0)
    I = (i, e): (boolean, N); initially (false, 0)
arrive(e)
    repeat
        x ←read(X)
        if x.e > e then return
        if x.c = 0 ∨ x.e < e then
            x' ←(1, true, x.v + 1, e)
        else                    /* assert x.c > 0 ∧ x.e = e */
            x' ←(x.c + 1, x.a, x.v, e)
    until CAS(X, x , x')
    if x'.a then
        repeat
            if LL(I ).e > e then return
        until SC(I , (true, e))
        CAS(X, x', (x'.c, false, x'.v, e))
depart(e)
    repeat
        x ←read(X)
        if x.e ≠ e then return
        if CAS(X, x , (x.c − 1, false, x.v, e)) then
            if x.c ≥ 2 then return
            repeat
                if LL(I ).e > e then return
                if Read(X).v ≠ x.v then return
                if SC(I , false) then return
query
    return read(I )
reset(e)
    repeat
        if LL(I ).e ≥ e then return false
    until SC(I , (false, e))
    return true
```

In the example code above, the concepts described with respect to the SNZI root node without reset are combined with the concepts introduced along with the reset operation (e.g., passing the epoch as a parameter in arrive and depart operations, checking for an epoch match before acting, and preserving the epoch when they match). This example includes an indicator bit, I and an announce bit, a, which is used as a helping mechanism. This helping mechanism is similar to the one described above regarding a SNZI root node that does not support reset. As with the hierarchical version of a SNZI-R object, an arrive operation may quit if the object's if the object's epoch is newer than e, and may treat the counter as if its value is 0 with respect to epoch e if e is newer than the object's epoch. Also note that in this embodiment, the indicator bit, I, is never modified if the indicator's epoch is newer than e. The reset operation illustrated in this example uses an LL/SC operation pair to atomically update I to false for the new epoch, i.e., it changes the epoch and indicator portions of I atomically to (false, e), where e is the new epoch begun by the reset.

Note that while the examples above describe that a new epoch may be specified through the API (e.g., specified as an input parameter of a reset operation call in a user application), in other embodiments a new epoch may be determined by the system. For example, in some embodiments a new epoch identifier may be generated by the operating system, by a contention manager, or by other means transparent to a programmer, and may be passed to an internal reset operation for execution by one of a plurality of threads in response to a reset operation call that does not include this parameter.

As discussed above, the SNZI solutions may in various embodiments achieve better performance than simple counters under high contention. In some embodiments, however, a simple counter may achieve better performance under low contention. Therefore, in some embodiments a variant of the SNZI mechanism, called Super-SNZI, may incorporate a small counter into the indicator word. In such embodiments, while contention is low, the algorithm may simply arrive and depart by incrementing and decrementing this counter (as in the simple counter mechanism), but as contention increases, arrive operations may begin to access the SNZI tree to ensure scalability. In such embodiments, a query operation may return false if and only if both the SNZI bit and the small counter value are 0.

There may be many alternatives for deciding which method to use when arriving. For example, in one embodiment, the SNZI algorithm may be used if an application fails to modify the counter too many times, if the counter is saturated, or if the SNZI indicator bit is already set. In such embodiments, a Super-SNZI may begin by using the simple counter, and may switch to the SNZI algorithm if contention is high. Super-SNZI may be especially suitable for applications in which Arrive and Depart performance and throughput are most important. Super-SNZI may provide the additional advantage that allocation of a SNZI tree may be delayed until it is used for the first time, thus avoiding excessive space overhead for SNZI objects that are not heavily contended. Such an optimization would be important, for example, when using SNZI to improve the scalability of reference counts. For example, in embodiments employing a Super-SNZI implementation, the space overhead of a SNZI tree may not be incurred for every object in the system, but only for those whose reference counts are updated frequently.

Note that while many of the examples described herein involve the use of a summary indicator whose value reflects whether a shared object has a zero or nonzero value, the system and methods described herein may be generally applicable to other types of shared objects and summary indicators with similar semantics. For example, in one embodiment, a shared data object may include a collection of Boolean values and an associated summary indicator value may reflect whether any of them are true. In this example, a query of the summary indicator may return a Boolean value of true if a summary value associated with the collection of Boolean values (e.g., a summary value corresponding to the logical OR of the collection of Boolean values) is true, and may return false if the summary value is false (i.e., if the logical OR of the collection of Boolean values is false). As with the SNZI-type objects described herein, the summary indicator associated with these shared data object may be updated only when the summary value for the shared data object changes in response to a change to the shared data object itself.

The semantics and programming model of these objects may be similar to those of the SNZI-type objects described herein. For example, they may support atomic read-modify-write operations for changing the value of the shared data object and/or its associated summary indicator, in some embodiments, and a query operation that returns a Boolean value of the summary indicator, rather than the value of the shared data object itself.

As with the SNZI, SNZI-R and Super-SNZI objects described herein, a summary indicator object may be used to reflect the summary value for one shared data object that includes a collection of Boolean values, or for a hierarchical tree of such objects, in different embodiments. For example, changes in the value of the shared summary indicator may reflect a filtering of one or more changes to the values of one or more child objects that each include a collection of Boolean values, as described herein regarding SNZI-type objects. Similarly, the shared data object may be resetable, in some embodiments, and may include an indication of a current epoch to which a modification of the shared data object applies. Other such shared data objects, summary values, and summary indicators having similar semantics and programming models are contemplated.

Figure 12:
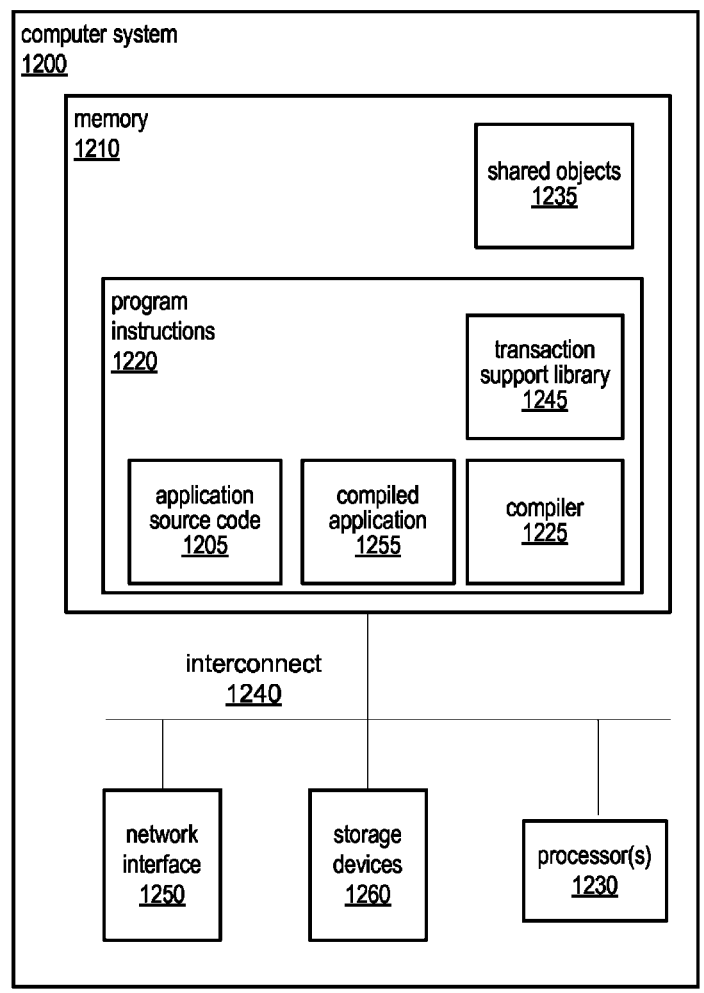
FIG. 12 is a block diagram illustrating an exemplary computer system capable of implementing SNZI objects, according to one embodiment.

The system and methods described herein may be suitable for application in any of various computing systems supporting concurrent computing. FIG. 12 illustrates a computing system capable of implementing SNZI, SNZI-R, Super-SNZI, and/or Super-SNZI-R objects, as described herein and according to various embodiments. Computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1200 may include a processor unit 1230 (possibly including multiple processors, a singlethreaded processor, a multi-threaded processor, a multi-core processor, etc.). The computer system 1200 also includes one or more system memories 1210 (e.g., one or more of cache, SRAM, DRAM, RDRAM, EDO RAM, DDR RAM, SDRAM, Rambus RAM, EEPROM, etc.), a system interconnect 1240 (e.g., LDT, PCI, ISA, etc.), a network interface 1250 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 12 (e.g., video cards, audio cards, additional network interfaces, peripheral devices, etc.). The processor unit 1230, the storage device(s) 1260, the network interface 1250, and the system memory 1210 are coupled to the system interconnect 1240. One or more of the system memories 1210 may embody a compiler configured to generate program instructions for implementing SNZI, SNZI-R, and/or Super-SNZI objects as described herein. Additionally, one or more of the system memories 1210 may embody an application including code implementing SNZI, SNZI-R, and/or Super-SNZI objects.

In some embodiments, memory 1210 may include program instructions 1220 configured to implement a compiler, such as compiler 1225, configured to generate program instructions for implementing SNZI, SNZI-R, and/or Super-SNZI objects, as described herein. Additionally, program instructions 1220 may comprise application source code 1205 and/or compiled application 1255, each of which may include code configured to access SNZI, SNZI-R, and/or Super-SNZI objects, as described herein. Furthermore, program instructions 1220 may be configured to implement a transaction support library 1245, configured to provide functions, operations and/or other processes for implementing hybrid transactional memory using SNZI, SNZI-R, and/or Super-SNZI objects, as described herein. Compiler 1225, application source code 1205, compiled application 1255, and/or transaction support library 1245 may each be implemented in any of various programming languages or methods. For example, in one embodiment, compiler 1225 and transaction support library 1245 may be Java™ based, while in other embodiments, they may be written using the C or C++ programming languages. Similarly, application source code 1205 may be implemented in Java™, C, or C++, among other programming languages, according to various embodiments. Moreover, in some embodiments, compiler 1225, transaction support library 1245, and application source code 1205 may not be implemented using the same programming language. For example, application source code 1205 may be C++ based, while compiler 1225 may be developed using C.

As illustrated in FIG. 12, memory 1210 may in some embodiments be configured to include shared objects 1235, which may include SNZI, SNZI-R, and/or Super-SNZI objects accessed by applications executing on computer system 1200, as well as non-SNZI objects. For example, in various embodiments, storage locations representing reference counters, ownership records, surplus indicators, announcement bits, and other shared resources may be included in memory 1210. Note also that although various examples included herein refer to both shared memory and local memory (e.g., cache memory), these structures may be implemented as different memory spaces (e.g., a shared memory space and one or more local memory spaces) within a single physical memory or as different memory spaces distributed across any number of physical memories, in different embodiments.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A method, comprising:
performing by a computer:
writing a value to a shared data object in memory, wherein the shared data object comprises a plurality of data elements whose values collectively represent the value written to the shared data object;
determining whether said writing changed a summary value associated with the shared data object, wherein the summary value is dependent on a mathematical or logical combination of the values of the plurality of data elements; and
in response to determining that said writing changed the summary value associated with the shared data object, modifying a value of a shared indicator object such that the modified value reflects the changed summary value.

2. The method of claim 1, wherein each of the plurality of data elements stores a Boolean value, the summary value represents a logical OR of the plurality of Boolean values, and the shared indicator comprises a Boolean value indicating whether the summary value is true.

3. The method of claim 1, wherein the summary value comprises a value of zero if the value of the shared data object is zero and nonzero if the value of the shared data object is nonzero; wherein said determining comprises determining whether the summary value changed from zero to nonzero or from nonzero to zero; and wherein the shared indicator object comprises a Boolean nonzero indicator object that indicates whether the summary value is zero or nonzero.

4. The method of claim 3, wherein, in response to determining that said writing changed the summary value from zero to nonzero, said modifying comprises incrementing the value of the shared indicator object.

5. The method of claim 3, wherein, in response to determining that said writing changed the summary value from nonzero to zero, said modifying comprises decrementing the value of the shared indicator object.

6. The method of claim 1, wherein each of the plurality of data elements of the shared data object is a bit of a shared counter and wherein the shared indicator object comprises a second shared counter.

7. The method of claim 6, further comprising:
determining whether said modifying the second shared counter changed a summary value associated with the second shared counter; and
in response to determining that said modifying the second shared counter changed the summary value associated with the second shared counter, modifying a value of a second shared indicator object such that the modified value of the second shared indicator object reflects the changed summary value associated with the second shared counter.

8. The method of claim 1, further comprising:
writing another value to the shared data object;
determining whether said writing another value changed the summary value associated with the shared data object; and
in response to determining that said writing another value did not change the summary value associated with the shared data object, preserving a current value of the shared indicator object.

9. The method of claim 1, wherein the plurality of data elements of the shared data object collectively implement a reference counter or ownership record corresponding to a shared resource, the method further comprising releasing the shared resource in response to determining that the shared indicator object indicates that the summary value is zero or false.

10. The method of claim 1, wherein at least one of said writing and said modifying are performed using an atomic read-modify-write type operation.

11. The method of claim 1, further comprising reading the value of the shared indicator object to determine the summary value, wherein said writing and said reading are performed by different threads executing on one or more processors.

12. The method of claim 1, wherein said writing a value to a shared data object comprises writing an intermediate value to the shared data object, the method further comprising, in response to determining that the value of the shared data object is equal to the intermediate value, initiating writing another value to the shared data object, wherein said writing a value and said writing another value are performed by different threads executing on one or more processors.

13. The method of claim 1, wherein said writing a value to a shared data object comprises:
initiating modification of the value of the shared data object on behalf of a first thread;
setting an announce indicator on behalf of the first thread, wherein the announce indicator indicates to other threads that a modification that will affect the value of the shared indicator object is in progress;
on behalf of a second thread, determining whether the announce indicator is set; and
in response to determining that the announce indicator is set, initiating another modification of the value of the shared data object on behalf of the first thread; and
initiating modification of the value of the shared data object on behalf of the second thread.

14. A system, comprising:
one or more processors; and
a memory coupled to the one or more processors; wherein the memory comprises:
a shared data object accessible by a plurality of threads executing on the one or more processors, wherein the shared data object comprises a plurality of data elements whose values collectively represent a value stored in the shared data object; and
a shared indicator object accessible by the plurality of threads;
wherein the memory further comprises program instructions executable by the
one or more processors to implement:
one of the plurality of threads writing a value to the shared data object;
determining whether said writing changed a summary value associated with the shared data object, wherein the summary value is dependent on a mathematical or logical combination of the values of the plurality of data elements; and
in response to determining that said writing changed the summary value associated with the shared data object, modifying a value of a shared indicator object such that the modified value reflects the changed summary value.

15. The system of claim 14, wherein each of the plurality of data elements stores a Boolean value, the summary value represents a logical OR of the plurality of Boolean values, and the shared indicator comprises a Boolean value indicating whether the summary value is true.

16. The system of claim 14,
wherein the summary value comprises a value of zero if the value of the shared data object is zero and nonzero if the value of the shared data object is nonzero, and wherein said determining comprises determining whether the summary value changed from zero to nonzero or from nonzero value to zero;
wherein the program instructions are further configured to implement:
in response to determining that said writing changed the summary value from zero to nonzero, said modifying comprises incrementing the value of the shared indicator object; and
in response to determining that said writing changed the summary value from nonzero to zero, said modifying comprises decrementing the value of the shared indicator object.

17. The system of claim 14, wherein the shared indicator object comprises a Boolean nonzero indicator object that indicates whether the summary value is zero or nonzero.

18. The system of claim 14, wherein the plurality of data elements of the shared data object collectively implement an identifier of a current epoch, wherein the program instructions are further executable by the one or more processors to implement:
prior to said writing, determining if an epoch specified by said one of the plurality of threads during said writing is equal to the current epoch, wherein said writing is performed in response to the epoch specified during said writing being equal to the current epoch;
returning without performing said writing in response to determining that the epoch specified during said writing is not equal to the current epoch; and
in response to one of the plurality of threads invoking a reset operation, setting the current epoch identifier to a new epoch value.

19. A non-transitory computer-readable storage medium comprising program instructions computer-executable to implement:
one of a plurality of threads executing on one or more processors writing a value to a shared data object in memory, wherein the shared data object comprises a plurality of data elements whose values collectively represent the value written to the shared data object;

determining whether said writing changed a summary value associated with the shared data object, wherein the summary value is dependent on a mathematical or logical combination of the values of the plurality of data elements;

in response to determining that said writing changed the summary value from zero to nonzero, setting the value of a shared Boolean indicator object to true; and in response to determining that said writing changed the summary value from nonzero to zero, setting the value of the shared Boolean indicator object to false.

20. The non-transitory storage medium of claim 19, wherein the program instructions are further computer-executable to implement:

an application programming interface comprising a query operation configured to return the value of the shared Boolean indicator object; and one of the plurality of threads executing the query operation to determine the value of the shared Boolean indicator object.

* * * * *

UNITED STATES PATENT AND TRADEMARK OFFICE
CERTIFICATE OF CORRECTION

| | | |
|---|---|---|
| PATENT NO. | : 8,909,601 B2 | Page 1 of 1 |
| APPLICATION NO. | : 11/939372 | |
| DATED | : December 9, 2014 | |
| INVENTOR(S) | : Moir et al. | |

It is certified that error appears in the above-identified patent and that said Letters Patent is hereby corrected as shown below:

In the Specification

In column 1, line 36, delete "modem shared" and insert -- modern shared --, therefor.

In column 23, line 10, delete "describe" and insert -- described --, therefor.

In column 26, line 1, delete "betreated" and insert -- be treated --, therefor.

In column 26, line 36, delete "N, N)," and insert -- N, N); --, therefor.

Signed and Sealed this
Twenty-eighth Day of July, 2015

Michelle K. Lee
*Director of the United States Patent and Trademark Office*